(12) United States Patent
Nguyen et al.

(10) Patent No.: US 9,775,161 B2
(45) Date of Patent: Sep. 26, 2017

(54) METHOD FOR PHICH RESOURCE ALLOCATION

(71) Applicant: NEC Corporation, Tokyo (JP)

(72) Inventors: Phong Nguyen, Victoria (AU); Yuanrong Lan, Victoria (AU)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/421,106

(22) PCT Filed: Feb. 28, 2014

(86) PCT No.: PCT/JP2014/056083
§ 371 (c)(1),
(2) Date: Feb. 11, 2015

(87) PCT Pub. No.: WO2014/148284
PCT Pub. Date: Sep. 25, 2014

(65) Prior Publication Data
US 2016/0007360 A1    Jan. 7, 2016

(30) Foreign Application Priority Data

Mar. 18, 2013  (AU) ............................. 2013-900937

(51) Int. Cl.
*H04J 3/00* (2006.01)
*H04W 72/04* (2009.01)
(Continued)

(52) U.S. Cl.
CPC ........... *H04W 72/0493* (2013.01); *H04L 1/16* (2013.01); *H04L 1/1861* (2013.01);
(Continued)

(58) Field of Classification Search
CPC .......... H04L 5/14; H04L 5/1423; H04Q 11/04
See application file for complete search history.

(56) References Cited

U.S. PATENT DOCUMENTS

2009/0175233 A1*  7/2009  Ojala ................... H04L 1/1854
                                                          370/329
2012/0230232 A1   9/2012  Ji et al.
(Continued)

FOREIGN PATENT DOCUMENTS

WO    WO-2012/106840 A1    8/2012
WO    WO-2012/175020 A1    12/2012

OTHER PUBLICATIONS

U.S. Appl. No. 61/753,354 Provisional Specification.*
(Continued)

*Primary Examiner* — Siren Wei
(74) *Attorney, Agent, or Firm* — Wilmer Cutler Pickering Hale and Dorr LLP

(57) ABSTRACT

A method is disclosed for PHICH resource allocation in a wireless communication system that supports flexible TDD UL-DL configuration and in which different TDD UL-DL configurations are available and the TDD UL-DL configuration used by first UEs which operate according to the flexible TDD configuration can be different to the TDD UL-DL configuration used by second UEs which operate according to a long term TDD UL-DL configuration. The method comprising allocating a PHICH resource for both first UEs and second UEs according to LTE timing rules applicable to the TDD UL-DL configuration in use by second UEs.

10 Claims, 18 Drawing Sheets

(51) Int. Cl.
  *H04L 1/16* (2006.01)
  *H04L 5/16* (2006.01)
  *H04L 5/00* (2006.01)
  *H04L 5/14* (2006.01)
  *H04L 1/18* (2006.01)

(52) U.S. Cl.
  CPC .......... *H04L 5/0053* (2013.01); *H04L 5/0055* (2013.01); *H04L 5/14* (2013.01); *H04L 5/1469* (2013.01); *H04L 5/16* (2013.01); *H04W 72/0446* (2013.01)

(56) References Cited

U.S. PATENT DOCUMENTS

| | | | |
|---|---|---|---|
| 2013/0201926 A1* | 8/2013 | Nam | H04L 1/1685 370/329 |
| 2013/0208587 A1* | 8/2013 | Bala | H04W 16/14 370/230 |
| 2013/0301490 A1* | 11/2013 | He | H04W 76/048 370/280 |
| 2014/0022964 A1 | 1/2014 | Guan et al. | |
| 2014/0086112 A1* | 3/2014 | Stern-Berkowitz | H04W 72/1289 370/280 |
| 2014/0161001 A1 | 6/2014 | Gao et al. | |
| 2014/0269539 A1* | 9/2014 | Yin | H04L 5/0092 370/329 |

OTHER PUBLICATIONS

Extended European Search Report issued in corresponding European Application No. 14769054.9, dated Mar. 4, 2016, 7 pages.
International Search Report corresponding to PCT/JP2014/056083, mail date May 13, 2014, (3 pages).
3GPP TS 36.211 v 10.5.0 (Jun. 2012), 3rd Generation Partnership Project; Technical Specification Group Radio Access Network; Evolved Universal Terrestrial Radio Access (E-UTRA); Physical Channels and Modulation (Release 10), (101 pages).
3GPP TSG-RAN WG1#61 R1-103202, Sharp, Handling PHICH collisions in Carrier Aggregation, May 10-14, 2010, (3 pages).
3GPP TSG-RAN WG1#72 R1-130804, LG Electronics, Correction on PHICH resource determination for CA with different TDD UL-DL Configurations, Jan. 28-Feb. 1, 2013, (4 pages).
3GPP TSG-RAN WG1#72 R1-130371, NEC Group, Study of backward compatibility of TDD eIMTA system, Jan. 28-Feb. 1, 2013 (5 pages).
3GPP TSG-RAN WG1#69, R1-122654, Intel Corporation, Considerations on ePHICH Design, May 21-25, 2012, (4 pages).

* cited by examiner

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | – | – | – | 2 | 1 | – | – | – |
| 1 | – | 1 | – | – | 1 | 0 | – | – | 1 | 1 |
| 2 | 0 | 0 | – | 1 | 0 | 0 | 0 | 0 | 1 | 0 |
| 3 | 1 | 0 | – | – | – | 0 | 0 | 0 | 1 | 1 |
| 4 | 0 | 0 | – | – | 0 | 0 | 0 | 0 | 1 | 1 |
| 5 | 0 | 0 | – | 0 | 0 | 0 | 0 | 0 | 1 | 0 |
| 6 | 1 | 1 | – | – | – | 1 | 1 | – | 1 | 1 |

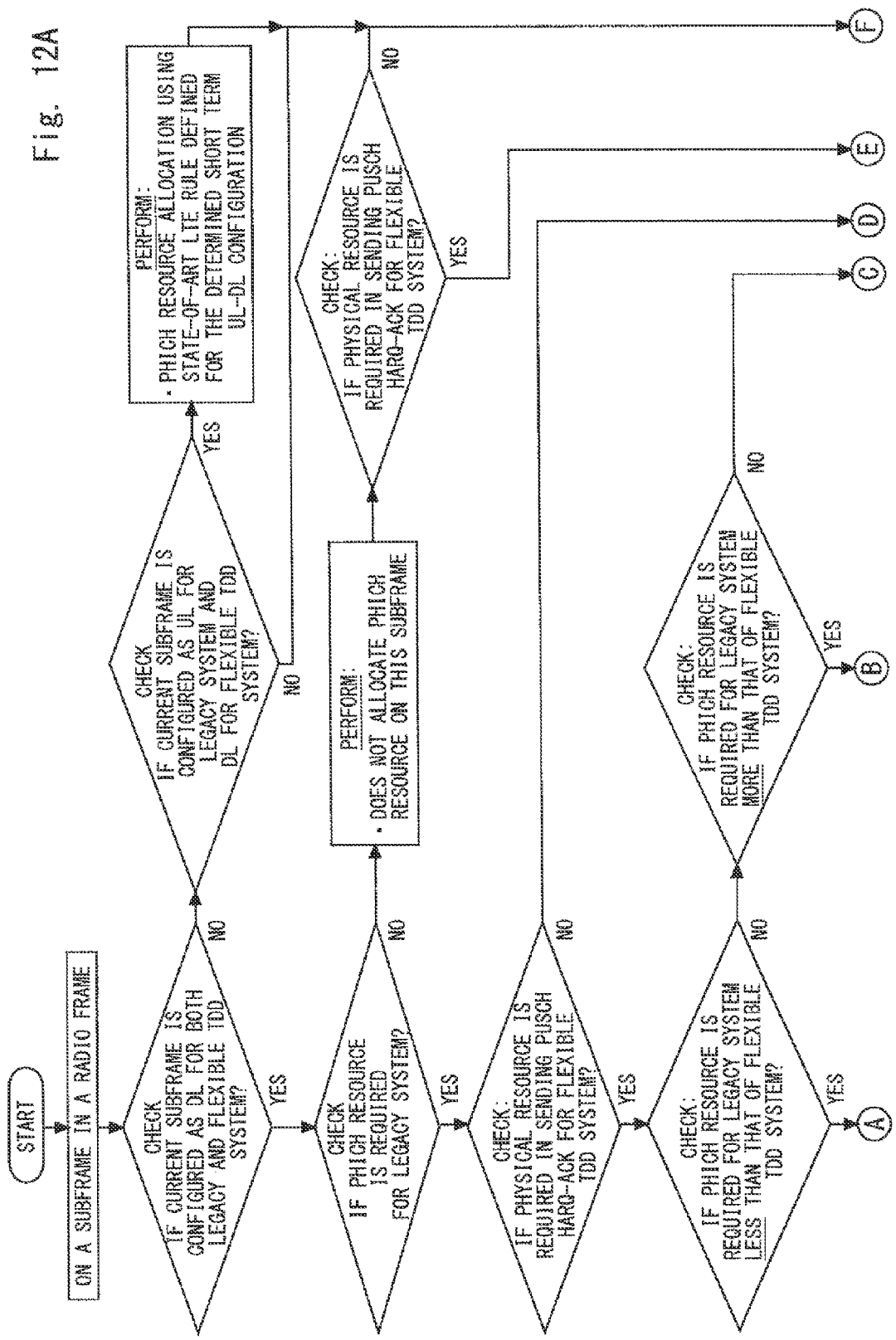

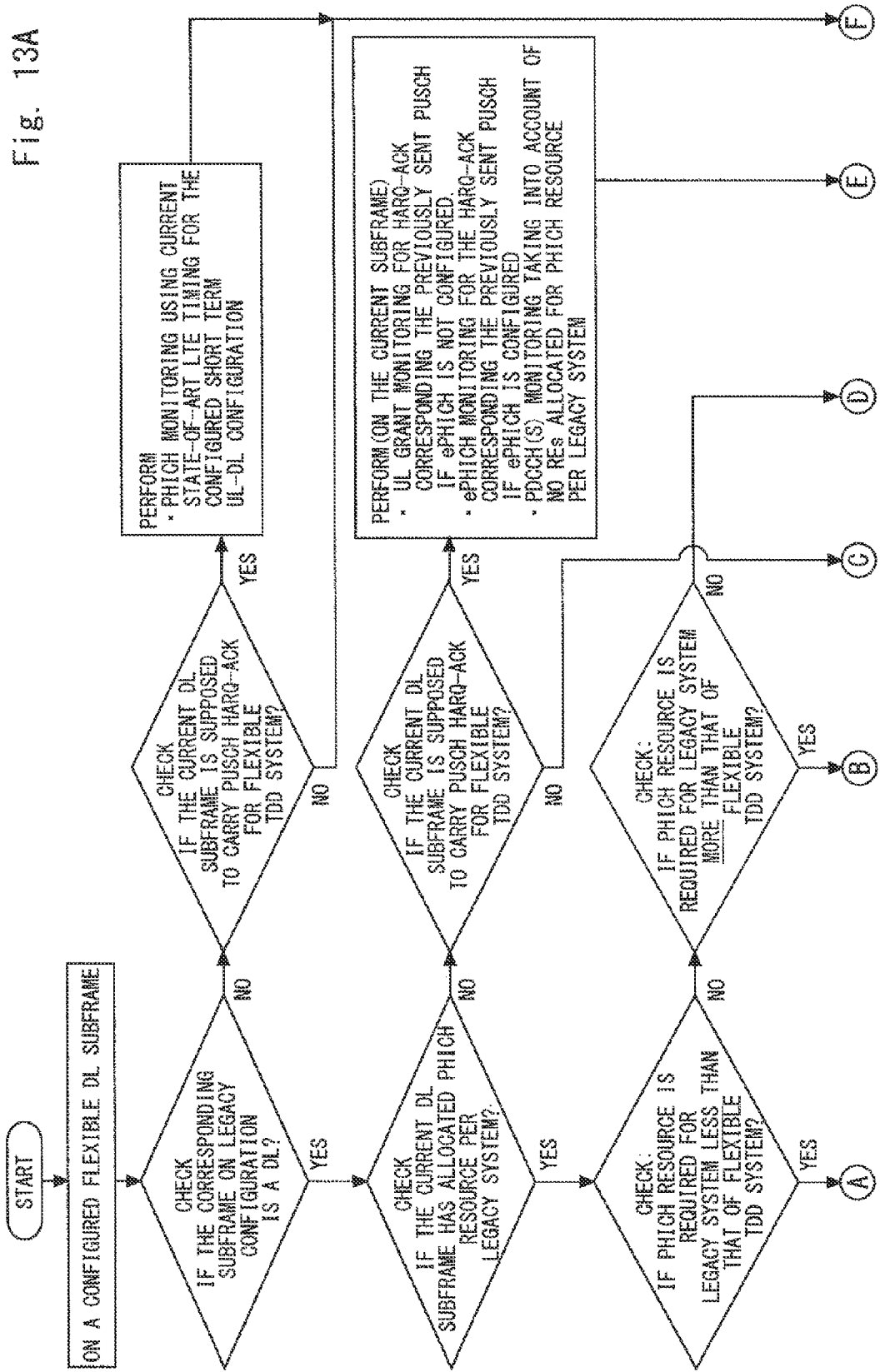

METHOD FOR PHICH RESOURCE ALLOCATION

CROSS-REFERENCE TO RELATED APPLICATIONS

The present application is a national stage application of International Application No. PCT/JP2014/056083 entitled "METHOD FOR PHICH RESOURCE ALLOCATION," filed on Feb. 28, 2014, which claims the benefit of priority of Australian Patent Application No. AU2013900937, filed on Mar. 18, 2013, the disclosures of which are incorporated herein in their entirety by reference thereto.

TECHNICAL FIELD

The present invention relates to a method for PHICH resource allocation.

BACKGROUND ART

The following abbreviations may be found herein:

| | |
|---|---|
| 3GPP | THIRD GENERATION PARTNERSHIP PROJECT |
| ACK | ACKNOWLEDGEMENT |
| BW | BANDWIDTH |
| CCE | CONTROL CHANNEL ELEMENT |
| CRS | CELL-SPECIFIC REFERENCE SIGNAL |
| DL | DOWNLINK |
| DM-RS | DEMODULATION REFERENCE SIGNAL |
| eNB (OR eNodeB) | LTE BASE STATION |
| HARQ (OR H-ARQ) | HYBRID AUTOMATIC REPEAT REQUEST |
| ICIC | INTER-CELL INTERFERENCE COORDINATION |
| IE | INFORMATION ELEMENT |
| LTE | LONG TERM EVOLUTION |
| LTE-A | LONG TERM EVOLUTION ADVANCED |
| MIB | MASTER INFORMATION BLOCK |
| NACK | NEGATIVE ACKNOWLEDGEMENT |
| OFDM | ORTHOGONAL FREQUENCY DIVISION MULTIPLEX |
| OFDMA | ORTHOGONAL FREQUENCY DIVISION MULTIPLE ACCESS |
| PBCH | PHYSICAL BROADCAST CHANNEL |
| PCFICH | PHYSICAL CONTROL FORMAT INDICATOR CHANNEL |
| PDCCH | PHYSICAL DOWNLINK CONTROL CHANNEL |
| PDSCH | PHYSICAL DOWNLINK SHARED CHANNEL |
| PHICH | PHYSICAL HARQ INDICATOR CHANNEL |
| PRB | PHYSICAL RESOURCE BLOCK |
| PUSCH | PHYSICAL UPLINK SHARED CHANNEL |
| RE | RESOURCE ELEMENT |
| REG | RESOURCE ELEMENT GROUP |
| TDD | TIME DIVISION DUPLEX |
| UE | USER EQUIPMENT |
| UL | UPLINK |

LTE wireless communication systems aim to provide enhanced services by means of higher data rates and lower latency with reduced cost. One benefit of deploying LTE TDD systems is to enable asymmetric UL-DL allocations in a radio frame. Typically if more data is to be sent in DL, there can be a higher number of DL subframes in a radio frame to accommodate that greater data volume. In LTE TDD systems, asymmetric resource allocation is realized by providing seven different semi-statically configured UL-DL subframe configurations for a given radio frame, as specified in Table 4.2-2 of 3GPP TS 36.211 v 10.5.0 (2012-06) which is extracted below.

TABLE 4.2-2

| | | Uplink-downlink configurations | | | | | | | | | |
|---|---|---|---|---|---|---|---|---|---|---|---|
| UPLINK-DOWNLINK CONFIGURATION | DOWNLINK-TO-UPLINK SWITCH-POINT PERIODICITY | SUBFRAME NUMBER | | | | | | | | | |
| | | 0 | 1 | 2 | 3 | 4 | 5 | 6 | 7 | 8 | 9 |
| 0 | 5 MS | D | S | U | U | U | D | S | U | U | U |
| 1 | 5 MS | D | S | U | U | D | D | S | U | U | D |
| 2 | 5 MS | D | S | U | D | D | D | S | U | D | D |
| 3 | 10 MS | D | S | U | U | U | D | D | D | D | D |
| 4 | 10 MS | D | S | U | U | D | D | D | D | D | D |
| 5 | 10 MS | D | S | U | D | D | D | D | D | D | D |
| 6 | 5 MS | D | S | U | U | U | D | S | U | U | D |

In the table above, "D" indicates a DL subframe, "U" indicates an UL subframe and "S" indicates a special subframe. The different UL-DL configurations in the table provide between 40% and 90% DL subframes, and in conventional practice the UL-DL configuration in use at an eNB is informed to the UE (and changed) only via system information on the broadcast channel. The UL-DL configuration is only configured semi-statically and so may not adapt to the instantaneous traffic situation. This is inefficient in terms of resource utilization, particularly in small cells or cells with a small number of users where the traffic situation can often change rapidly.

To address this inefficiency, a flexible TDD configuration study item for LTE-A Release 11 (Rel. 11) was completed. Evaluations in the study item revealed possibly significant performance benefits by allowing TDD UL-DL reconfiguration based on traffic adaptation in small cells. The studies also recommend interference mitigation scheme(s) for systems with TDD UL-DL reconfiguration.

As with asymmetric UL-DL configuration and flexible TDD allocation, there are several challenges to overcome before any implementation may be considered viable. One particular challenge is to allow reconfiguration of TDD UL-DL configuration on at most a radio frame basis without significant impact on the current 3GPP specification, and to allow coexistence with legacy (i.e. Rel. 8, 9, 10) UEs. It is thought that improving PHICH resource allocation and maintaining backward compatibility may help in this regard.

Figure 1:
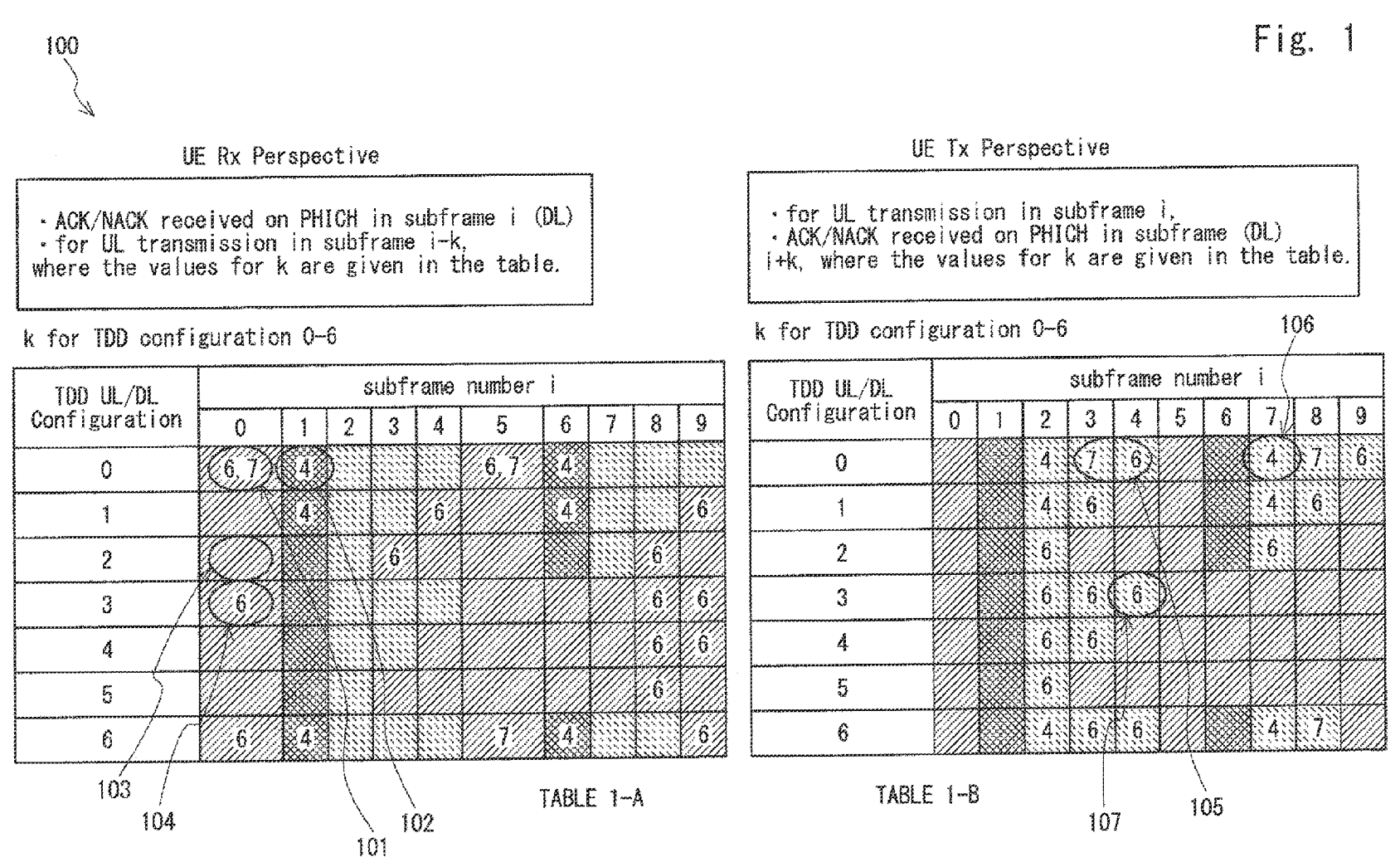

FIG. 1 shows UE ACK/NACK procedure 100 (PUSCH transmission and PHICH reception) in TDD system. As an example of the LTE timing rules specified in Rel. 11 and illustrated in FIG. 1, one DL subframe may have the responsibility to send HARQ-ACK bits for 0, 1 or 2 UL subframe(s), depending on the adopted TDD configuration and DL subframe index. For instance:

If TDD configuration #0 is used, DL subframe #0 (101) in radio frame n is responsible for sending HARQ-ACK for two UL subframes (105), namely UL subframes #3 and #4 in radio frame 'n−1', and DL subframe #1 (102) in radio frame n is responsible for sending HARQ-ACK for one UL subframe, namely subframe #7 (106) in radio frame 'n−1'.

If TDD configuration #2 is used, then DL subframe #0 (103) has no responsibility for sending HARQ-ACK feedback for any UL transmission and, as a result, there is no PHICH resource allocation on this DL subframe (103).

If TDD configuration #3 is used, then DL subframe #0 (104) is responsible for sending HARQ-ACK feedback for one UL subframe, namely subframe #4 (107).

etc

The PHICH resource allocation on each DL/Special subframe for each TDD configuration is further illustrated in FIG. 2. The factor $m_i$ (as given by individual entries in the table) indicates how many copies of PHICH resource are assigned on a given DL subframe in the TDD system.

In Rel. 8, 9, 10 and 11, PDCCH is transmitted on CCE which is made up by REs (or REGs) not occupied by CRS, PCFICH and PHICH. The antenna port for CRS can be determined by blind decoding of PBCH and REs used for PCFICH are predefined. Although PHICH configuration can be determined from PHICH-Config via PBCH/MIB decoding, nevertheless for TDD systems it is still not sufficient to determine how many REs (or REGs) are used for PHICH. For example, for a configured DL system BW of 10 MHz, assuming Ng=1/6, then $N_{PHICH}^{Group}=2$, it is still necessary to know the factor $m_i$ which depends on eNB configured UL-DL configuration in order to further determine the exact number of REs (or REGs) occupied by PHICH resource.

The value of $m_i$ is related to TDD configuration and DL subframe index. As a result, in order to figure out the REs used for PHICH and thus determine the REs (or REGs) that are carrying PDCCH(s), the TDD configuration should be determined first. However, TDD configuration is transmitted in SIB1 via PDCCH with an associated PDSCH and the problem becomes tricky because the index of TDD configuration is needed in order to decode PDCCH with an associated PDSCH which contains the index of TDD configuration. This is therefore a "chicken-egg" problem. One way to solve this problem, as was agreed in the standardization meeting, is that a UE should perform blind decoding by assuming on a particular subframe the possible value of $m_i$ in order to get the TDD configuration, and start to use the detected TDD configuration to decode other PDCCH.

FIG. 3 shows PDCCH blind decoding and PHICH resource assignment 300. As illustrated in FIG. 3, for different TDD configurations/DL subframes, the REG available for PDCCH transmission may be different, although PHICH configuration PHICH-Config stays the same Case 1: No PHICH resource assignment, $m_i=0$ 4 REGs (301) are used for PCFICH transmission, all other REGs can be used for PDCCH transmission Case 2: PHICH resource assignment for one UL subframe, $m_i=1$ Beside the 4 REGs used for PCFICH transmission, another 6 REGs (302) are used for PHICH transmission, and the remaining REGs can be used for PDCCH transmission Case 3: PHICH resource assignment for two UL subframes, $m_i=2$ 6 additional REGs are used for PHICH transmission, and the remaining REGs can be used for PDCCH transmission.

From the above example, it can be appreciated that if a UE has an incorrect understanding of the $m_i$ value (which is determined by TDD configuration and subframe index), or PHICH resource is not assigned according to factor $m_i$ known by the UE, then the UE will have an incorrect understanding of CCE to REG mapping and will fail to decode PDCCH.

SUMMARY OF INVENTION

Technical Problem

In flexible-TDD systems, it is highly likely that the TDD configuration of legacy UEs will not be the same as the TDD configuration used by flexible-TDD UEs. If PHICH resource is assigned to flexible-TDD UEs by following factor $m_i$ related to TDD configuration of flexible-TDD UEs, then legacy UEs will have problem in decoding PDCCH. It would be desirable to maintain backward compatibility in flexible-TDD systems while sending HARQ-ACK for UL transmission.

It is to be clearly understood that mere reference herein to previous or existing apparatus, systems, methods, practices, publications or other information, or to any associated problems or issues, does not constitute an acknowledgement or admission that any of those things individually or in any combination formed part of the common general knowledge of those skilled in the field, or that they are admissible prior art.

Solution to Problem

In one form, the present invention relates broadly to a method for PHICH resource allocation (or a method for resource allocation for the transmission of PUSCH HARQ-ACK feedback) in a wireless communication system that supports a flexible TDD UL-DL configuration and in which different TDD UL-DL configurations are available and the TDD UL-DL configuration used by first UEs which operate according to the flexible TDD configuration can be different to the TDD UL-DL configuration used by second UEs which operate according to a long term TDD UL-DL configuration, the method comprising allocating PHICH resources for both first UEs and second UEs according to LTE timing rules applicable to the TDD UL-DL configuration in use by second UEs. Generally, the first UEs will be flexible-TDD UEs (e.g. Rel. 12 & beyond UEs) and the second UEs will be legacy UEs (e.g. Rel. 8, 9, 10 or 11 UEs), and the term 'first UEs' and 'second UEs' may be understood accordingly in the following description.

In the form of the invention described in the previous paragraph, the method may also include, determining that PHICH resource is allocated for second UEs with factor $m_i=2$, determining that HARQ-ACK for only one UL subframe should be fed back for first UEs, and allocating PHICH resource with $I_{PHICH}=1$ for first UEs. The method may further include determining that PHICH resource is assigned for second UEs with factor $m_i=1$, determining that HARQ-ACK for two UL subframes should be fed back, and allocating the assigned PHICH resource with $I_{PHICH}=1$ for first UEs to accommodate PUSCH HARQ feedback for the second subframe.

In another form, the present invention relates broadly to a method for PHICH resource allocation (or a method for resource allocation for the transmission of PUSCH HARQ-ACK feedback) in a wireless communication system that supports a flexible TDD UL-DL configuration and in which different TDD UL-DL configurations are available and the TDD UL-DL configuration used by first UEs which operate according to the flexible TDD configuration can be different to the TDD UL-DL configuration used by second UEs which operate according to a long term TDD UL-DL configuration, the method involving, for a given subframe of a radio frame:

determining that the subframe is not a DL subframe in both the TDD UL-DL configuration in use by first UEs and the TDD UL-DL configuration in use by second UEs, determining that the subframe is a DL subframe in the TDD UL-DL configuration in use by first UEs but an UL subframe in the TDD UL-DL configuration in use second UEs, and allocating PHICH resource according to LTE timing rules applicable to the TDD UL-DL configuration in use by first UEs.

In the form of the invention described in the previous paragraph, the method may also include, determining that said given subframe is a DL subframe in the TDD UL-DL configuration in use by first UEs and also in the TDD UL-DL configuration in use by second UEs, determining that a PHICH resource is not required (in the TDD UL-DL configuration in use) by second UEs for said subframe, and allocating no PHICH resource to the subframe. The method may further include, for said subframe, determining that a PHICH resource is required (in the TDD UL-DL configuration in use) by first UEs, calculating the PHICH resource required for sending PUSCH HARQ-ACK or remaining PUSCH HARQ-ACK, and allocating the PHICH resource for transmission thereof via ePHICH IE if available and enabled or via UL grant if ePHICH IE is not available or not enabled.

The method may further include determining that a PHICH resource is required (in the TDD UL-DL configuration in use) by second UEs for said given subframe, determining that PHICH resource is not required (in the TDD UL-DL configuration in use) by first UEs, and allocating the PHICH resource according to the LTE timing rules applicable to the TDD UL-DL configuration in use by second UEs.

The method may further include determining that a PHICH resource is required (in the TDD UL-DL configuration in use) by first UEs for said subframe, determining that the PHICH resource required (in the TDD UL-DL configuration in use) by second UEs is not less than that required (in the TDD UL-DL configuration in use) by first UEs, determining that the PHICH resource required (in the TDD UL-DL configuration in use) by second UEs is not more than that required (in the TDD UL-DL configuration in use) by first UEs, and allocating the PHICH resource according to the LTE timing rules applicable to the TDD UL-DL configuration in use by second UEs.

The method may further include determining that the PHICH resource required (in the TDD UL-DL configuration in use) by second UEs in said subframe is more than that required (in the TDD UL-DL configuration in use) by first UEs for said given subframe, allocating PHICH resource according to the LTE timing rules applicable to the TDD UL-DL configuration in use by second UEs, and allocating PHICH resource with $I_{PHICH}=1$ for first UEs.

The method may further include determining that the PHICH resource required (in the TDD UL-DL configuration in use) by second UEs in said subframe is less than that required (in the TDD UL-DL configuration in use) by first UEs, allocating the PHICH resource according to the LTE timing rules applicable to the TDD UL-DL configuration in use by second UEs, and allocating the PHICH resource for first UEs to accommodate HARQ-ACK for associated UL subframe(s) that have PUSCH HARQ-ACK timing aligned with that of second UEs.

The method may further include, for said given subframe, calculating the PHICH resource required for sending PUSCH HARQ-ACK or remaining PUSCH HARQ-ACK of first UEs, and allocating PHICH resource for transmission thereof via ePHICH IE if this is available and enabled or via UL grant if ePHICH IE is not available or not enabled.

In another form, the present invention relates broadly to a wireless communication system including a base station, first UEs and second UEs, wherein the wireless communication system supports a flexible TDD UL-DL configuration, different TDD UL-DL configurations are available and the TDD UL-DL configuration used by the first UEs which operate according to the flexible TDD configuration can be different to the TDD UL-DL configuration used by the second UEs which operate according to a long term TDD UL-DL configuration, and wherein the base station is operable to perform the method for PHICH resource allocation as described in the various forms of the invention above.

In another form, the present invention relates broadly to a base station operable for use in a wireless communication system that supports a flexible TDD UL-DL configuration and in which different TDD UL-DL configurations are available and the TDD UL-DL configuration used by first UEs which operate according to the flexible TDD configuration can be different to the TDD UL-DL configuration used by second UEs which operate according to a long term TDD UL-DL configuration, and wherein the base station is operable to perform a method as described in the various method forms of the invention above.

In another form, the present invention relates broadly to a method for use by first UEs for PUSCH HARQ-ACK and PHICH signalling (or a method for reception of PUSCH HARQ-ACK for use by UEs) in a wireless communication system that supports flexible TDD UL-DL configuration and in which different TDD UL-DL configurations are available and the TDD UL-DL configuration used by the first UEs which operate according to the flexible TDD configuration can be different to the TDD UL-DL configuration used by second UEs which operate according to a long term TDD UL-DL configuration, the method involving, for a given flexible DL subframe of a radio frame in the TDD UL-DL configuration in use by the first UEs:

determining that the corresponding subframe in the TDD UL-DL configuration in use by the second UEs is not a DL subframe, determining that the given DL subframe in the TDD UL-DL configuration in use by the first UEs is to carry PUSCH HARQ-ACK, and monitoring for PHICH allocation according to LTE timing rules applicable to the TDD UL-DL configuration in use by first UEs.

In the form of the invention described in the previous paragraph, the method may further include, determining that the corresponding subframe in the TDD UL-DL configuration in use by the second UEs is a DL subframe, determining that said corresponding subframe in the TDD UL-DL configuration in use by the second UEs is not allocated PHICH resource according to the LTE timing rules applicable to the TDD UL-DL configuration in use by the second UEs, determining that the given DL subframe in the TDD UL-DL configuration in use by the first UEs is to carry PUSCH HARQ-ACK, and performing the following on the subframe:

UL grant monitoring for HARQ-ACK corresponding to previously sent PUSCH, if ePHICH is not configured;

ePHICH monitoring for HARQ-ACK corresponding to previously sent PUSCH, if ePHICH is configured; and PDCCH(s) monitoring taking into account the number of REs allocated for PHICH for second UEs.

The method may further include, for the given flexible DL subframe, determining that said corresponding subframe in the TDD UL-DL configuration in use by the second UEs is allocated PHICH resource according to the LTE timing rules applicable to the TDD UL-DL configuration in use by the second UEs, determining that the PHICH resource required (in the TDD UL-DL configuration in use) by second UEs is not less than that required (in the TDD UL-DL configuration in use) by first UEs, determining that the PHICH resource required (in the TDD UL-DL configuration in use) by second UEs is not more than that required (in the TDD UL-DL configuration in use) by first UEs, and performing PHICH monitoring according to the LTE timing rules applicable to the TDD UL-DL configuration in use by second UEs and performing PDCCH(s) monitoring taking into account the number of REs allocated for PHICH for second UEs.

The method may further include, for the given flexible DL subframe, determining that the PHICH resource required (in the TDD UL-DL configuration in use) by second UEs is more than that required (in the TDD UL-DL configuration in use) by first UEs, and performing PHICH monitoring with $I_{PHICH}=1$ and performing PDCCH(s) monitoring taking into account the number of REs allocated for PHICH for second UEs.

The method may further include, for the given flexible DL subframe, determining that the PHICH resource required (in the TDD UL-DL configuration in use) by second UEs is less than that required (in the TDD UL-DL configuration in use) by first UEs, and performing on the subframe:

PHICH monitoring for HARQ-ACK of associated UL subframe(s) having PUSCH HARQ-ACK timing aligned with that of the TDD UL-DL configuration in use by second UEs, UL grant monitoring for HARQ-ACK of associated UL subframe(s) that is/are not included in the PHICH of second UEs, if ePHICH is not configured, ePHICH monitoring for HARQ-ACK of associated UL subframe(s) that is/are not included in the PHICH of second UEs, if ePHICH is configured, PDCCH(s) monitoring taking into account the number of REs allocated for PHICH for second UEs.

In another form, the invention relates broadly to a mobile station operable for use as a first UE in a wireless communication system that supports a flexible TDD UL-DL configuration and in which different TDD UL-DL configurations are available and the TDD UL-DL configuration used by first UEs which operate according to the flexible TDD configuration can be different to the TDD UL-DL configuration used by second UEs which operate according to a long term TDD UL-DL configuration, and wherein the mobile station is operable to perform the method for PUSCH HARQ-ACK and PHICH signalling for use by first UEs as described above.

In another form, the invention relates broadly to a method for use in ePHICH mapping in a wireless communication system that supports a flexible TDD UL-DL configuration and in which different TDD UL-DL configurations are available and the TDD UL-DL configuration used by first UEs which operate according to the flexible TDD configuration can be different to the TDD UL-DL configuration used by second UEs which operate according to a long term TDD UL-DL configuration, the method comprising using a subset of spare bits out of a set of spare bits in a master information block (MIB) for ePHICH configuration. Preferably, the method comprises using three out of ten spare bits in a MIB for ePHICH configuration.

Any of the features described herein can be combined in any combination with any one or more of the other features described herein within the scope of the invention.

Advantageous Effects of Invention

According to the present invention, it is possible to provide a flexible TDD wireless communication systems.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 1 illustrates UE ACK/NACK procedure (PUSCH transmission and PHICH reception) in a TDD system. In other words, FIG. 1 helps to illustrate the operation of the LTE timing rules for PUSCH HARQ-ACK feedback according to TDD UL-DL configuration and subframe number.

FIG. 2 contains a table with the factor $m_i$ for different subframes in different UL-DL configurations.

FIG. 12A contains a flow chart illustrating a method for resource allocation for the transmission of PUSCH HARQ-ACK feedback according to an embodiment of the invention.

Figure 12B:
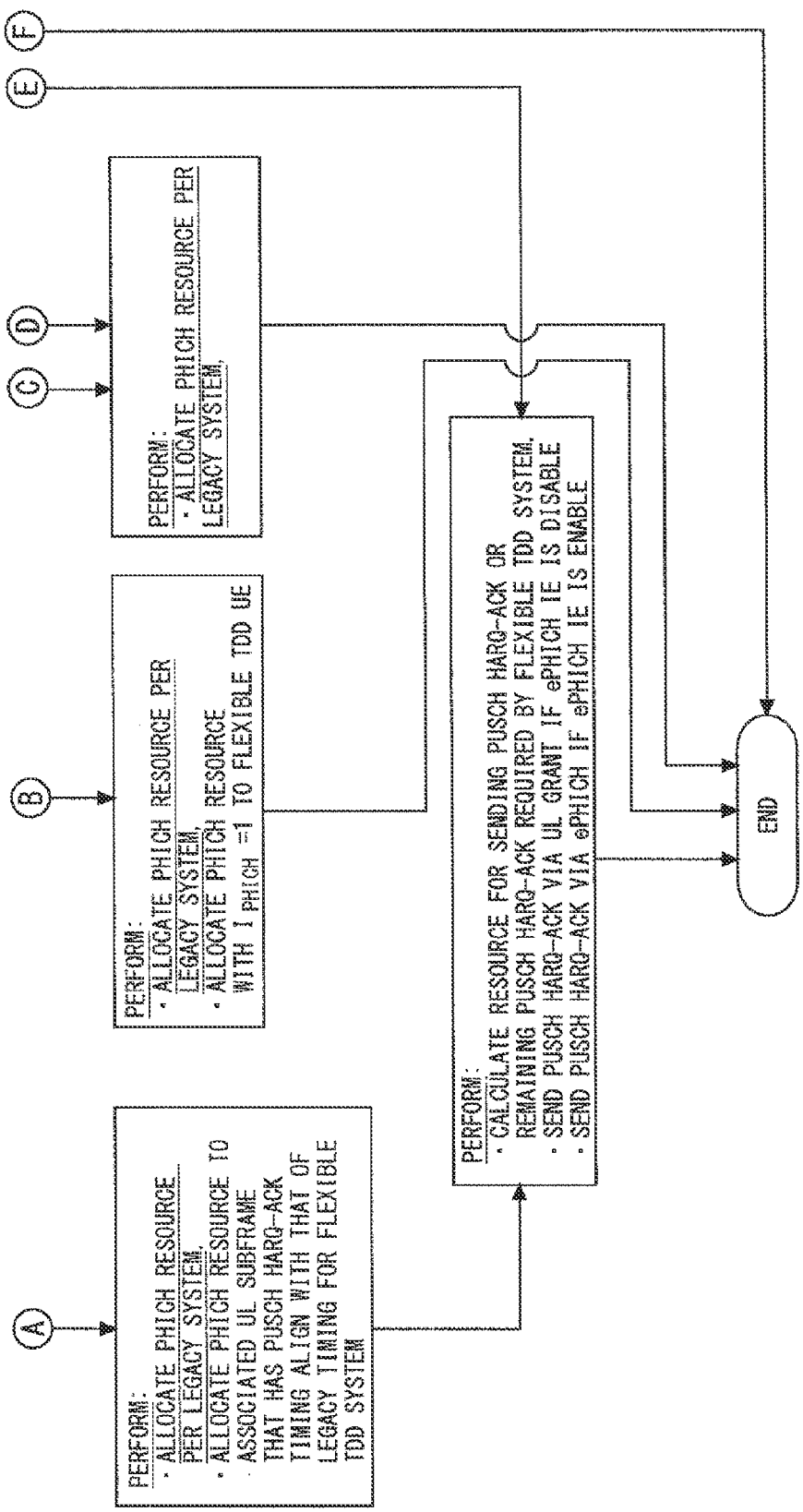
FIG. 12B contains the flow chart illustrating a method for resource allocation for the transmission of PUSCH HARQ-ACK feedback according to an embodiment of the invention.

The method represented by the flow chart in FIG. 12A and FIG. 12B may be performed by a base station/eNB.

FIG. 13A contains a flow chart illustrating a method for the reception of PUSCH HARQ-ACK which may be used by UEs that operate according to the flexible TDD configuration (i.e. by first UEs such as, e.g., Rel. 12 & beyond UEs) according to an embodiment of the invention.

Figure 13B:
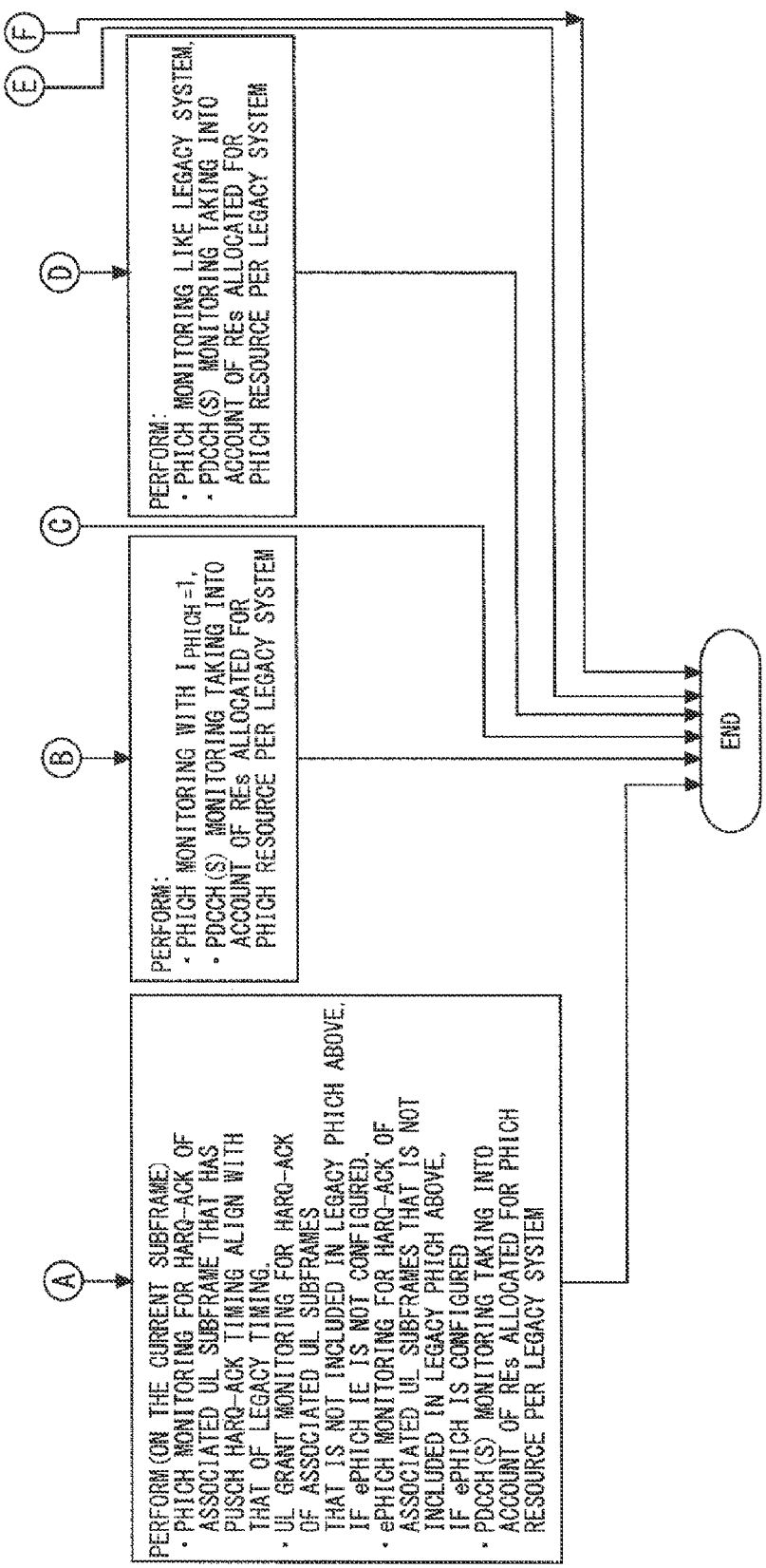

FIG. 13B contains the flow chart illustrating a method for the reception of PUSCH HARQ-ACK which may be used by UEs that operate according to the flexible TDD configuration (i.e. by first UEs such as, e.g., Rel. 12 & beyond UEs) according to an embodiment of the invention.

Figure 14:
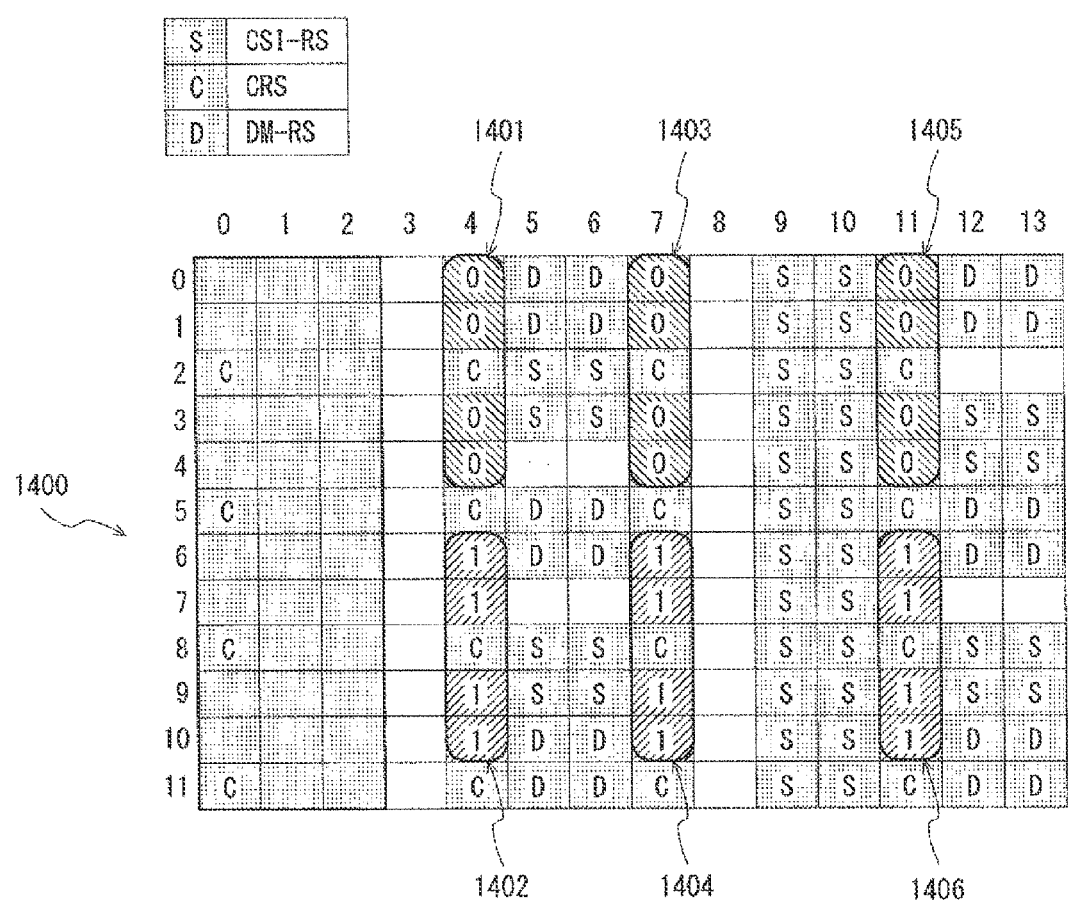

FIG. 14 helps to illustrate/explain a method for use in ePHICH mapping.

Figure 15:
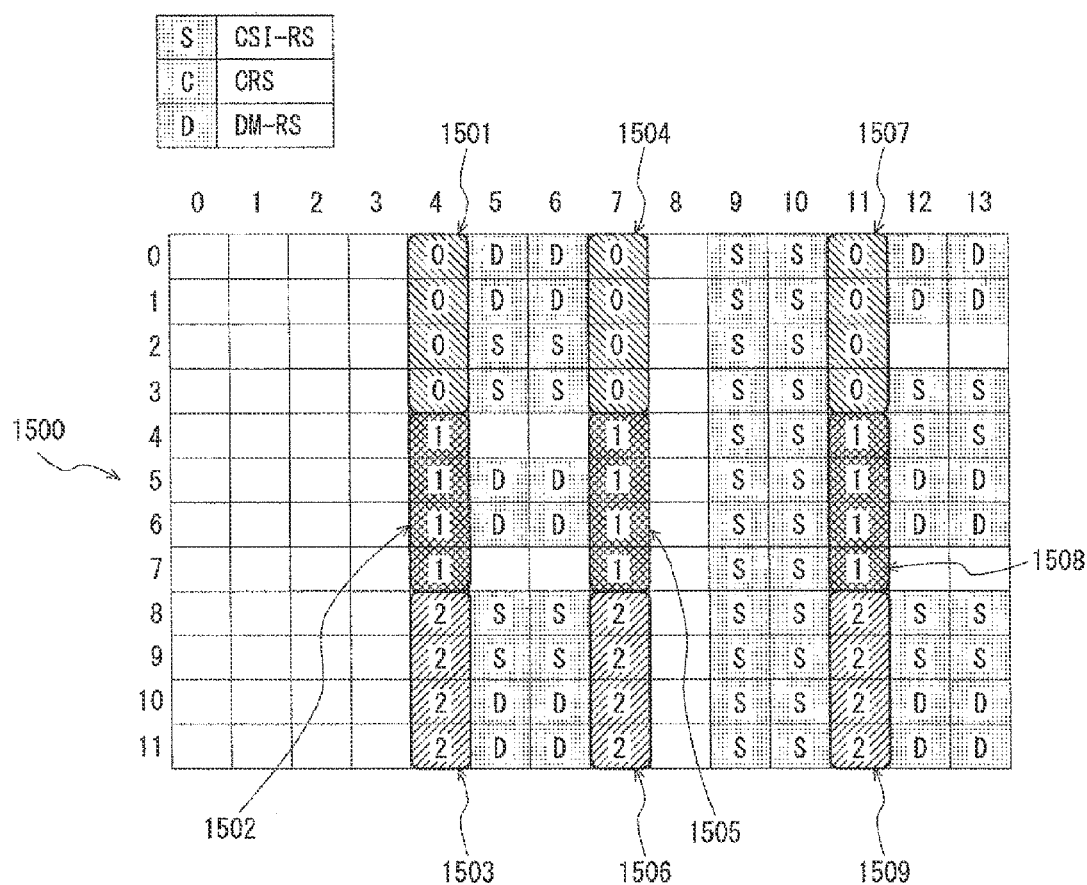

FIG. 15 helps to illustrate/explain a method for use in ePHICH mapping.

Figure 16:
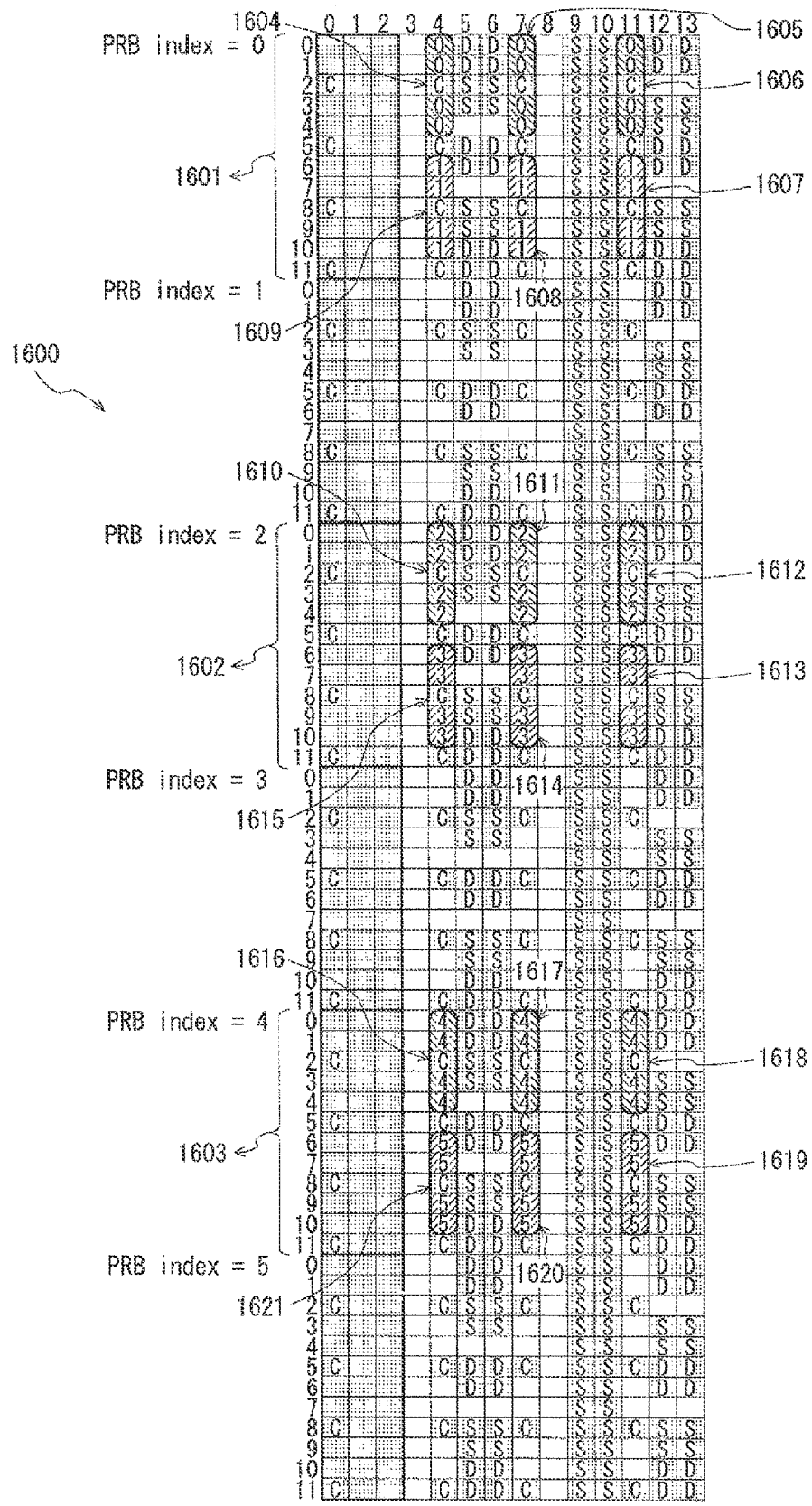

FIG. 16 helps to illustrate/explain a method for use in ePHICH mapping.

DESCRIPTION OF EMBODIMENTS

Figure 4:
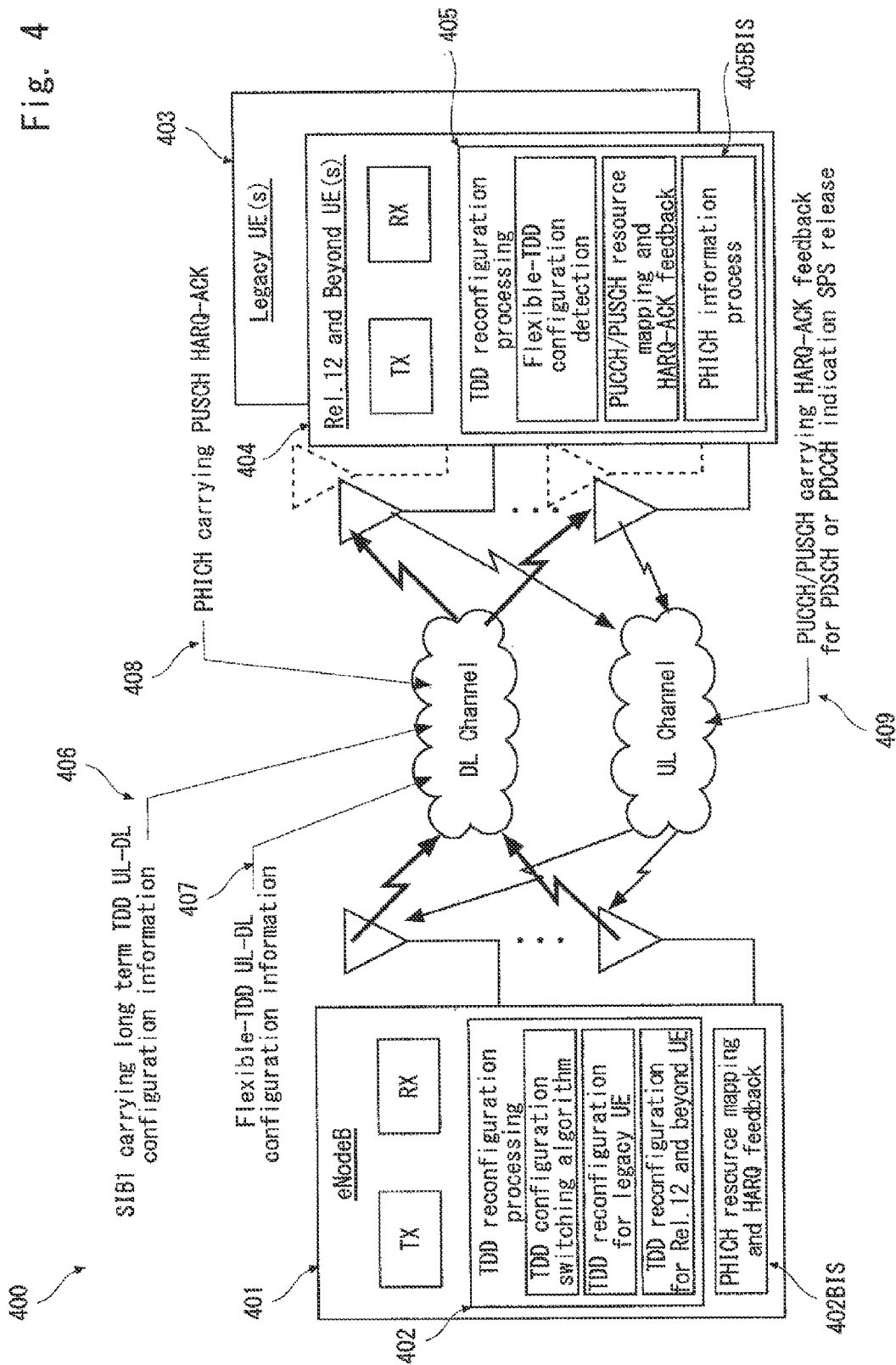
FIG. 4 is a schematic illustration of a flexible-TDD wireless communication system.

Explanations will hereafter be given with reference to, and in the context of, wireless communication systems that support Flexible-TDD UL-DL configuration, an example of which is shown schematically in FIG. 4. The wireless communication system (400) depicted in FIG. 4 consists of a Rel. 12 & beyond eNB (401) which is backward compatible with previous releases such as Rel. 8, Rel. 9, Rel. 10 and Rel. 11. The eNB (401) provides wireless connectivity, network access and coverage for second/legacy UE(s) (403) as well as Rel. 12 & and beyond (i.e. "first") UE(s) (404). The eNB (401) further has a "TDD reconfiguration processing" function (402) which takes the UL-DL traffic ratio observed in unrestricted timeframe into consideration when it performs a TDD configuration switching algorithm for the selection of appropriate long term and short term TDD UL-DL configuration for legacy UE(s) (403) and Rel. 12 & beyond UE(s) (404) respectively, and a "PHICH resource mapping and HARQ feedback" function (402BIS) which takes into consideration the existence of legacy UE(s) operating within eNB (401) coverage and assigns PHICH resource that ensures no impact on legacy UE performance.

The eNB (401) will broadcast long term "TDD UL-DL configuration" to both legacy UE(s) (403) and Rel. 12 & beyond UE(s) using SIB1 (System Information Block type 1) (406). The TDD UL-DL configuration transmitted on SIB1 is considered "long term" configuration as the period for SIB1 update is the order of 640 ms. The eNB (401) will also communicate "short term" TDD UL-DL configuration but only to Rel. 12 & beyond UE(s) (404) using a fast signalling approach and the period for TDD UL-DL configuration update can be as little as 10 ms (i.e. radio frame basis). The eNB (401) will also transmit PHICHs on subframes that are determined by the "PHICH resource mapping and HARQ feedback" function (402BIS).

In addition to performing the reception and use of TDD UL-DL configuration broadcasted on SIB1, a Rel. 12 & beyond UE(s) (404) that operates within coverage of Rel. 12 & beyond eNB (401) will further comprise TDD reconfiguration processing function (405) which detects short term UL-DL configuration information (407). This function (405) will also perform PDSCH H-ARQ encoding and selection of the appropriate UL subframe(s) for sending PDSCH H-ARQ feedback to eNB (401). This function (405) will also perform the determination of DL subframe on which it will monitor for its UL grant for the transmission of UL-SCH. The function (405) further includes function (405BIS) which determines the required PHICH resource and DL subframe on which it will receive H-ARQ-ACK corresponding to UL-SCH that it sends in previously granted UL-subframe(s) using configured PHICH resource or/and UL grant or configured ePHICH resource.

For legacy UE(s) (403) operating within the Rel. 12 & beyond eNB (401) range, it/these shall use TDD UL-DL configuration broadcasted on SIB1 and operate according to the legacy specifications that it/they complies to. The eNB (401) may not schedule legacy UE(s) (403) to perform reception of PDSCH(s) or transmission of PUSCH(s) on the "flexible subframes".

Embodiments of the invention may concern, inter alia, one or more of a method for PHICH/ePHICH resource allocation and in particular for determining appropriate physical resources including PHICH, UL Grant, and ePHICH for sending of PUSCH HARQ-ACK (408), a procedure that may be implemented as eNB's PHICH resource mapping and HARQ feedback function (402BIS) for the correct selection of physical resources for the transmission of PUSCH HARQ-ACK ensuring no impact on legacy UE operating within eNB (401) coverage, and a procedure that may be implemented as the Rel. 12 & beyond UE PHICH information processing function (405BIS) for the correct reception PUSCH HARQ-ACK and processing of PHICH. FIG. 4 also shows PUCCH/PUSCH carries HARQ-ACK feedback for PDSCH or PDCCH indication SPS release (409).

Reference Configuration Selection for UL-SCH HARQ Timing

As legacy UE(s) have no knowledge of the Flexible-TDD system in use, PHICH resource assignment in embodiments of the invention will generally follow the TDD configuration used by legacy UE(s), at least on fixed DL subframes. This may help to ensure that there is no performance impact on legacy UE(s) with regard to the reception of PHICH(s) and PDCCH(s) intended for it/them.

Figure 5:
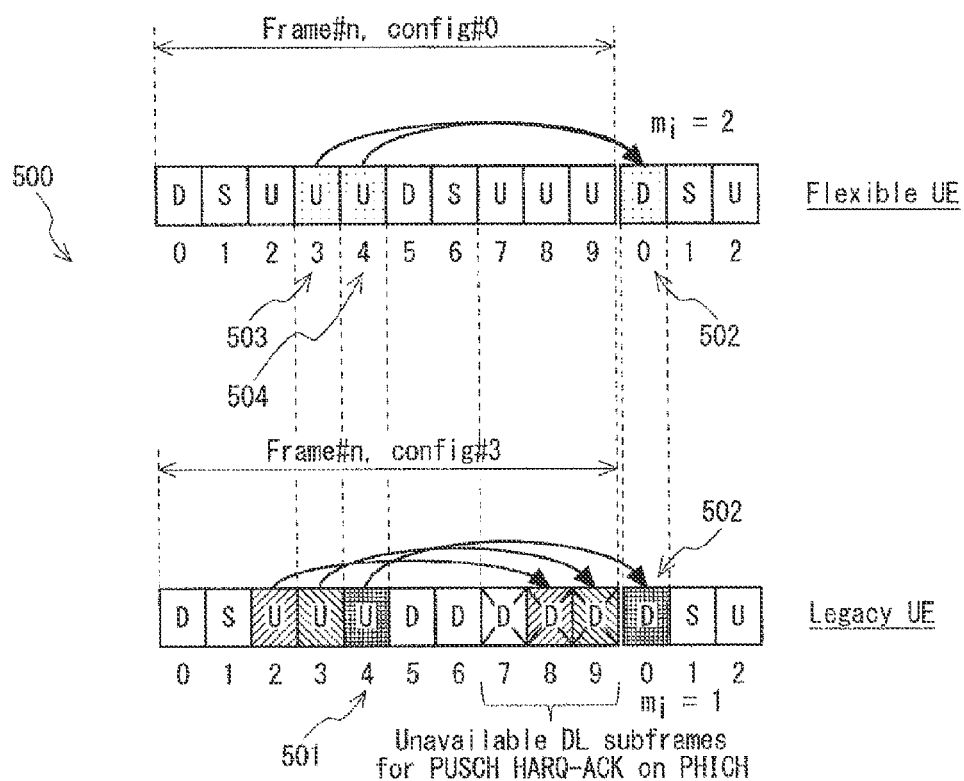
FIG. 5 contains illustrations corresponding to different example situations which are used to explain the operation of the invention (or at least embodiments of the invention) in such situations.

For example, in FIG. 5 (FIG. 5 shows resource assignment 500), configuration #3 is configured for legacy UE(s)

and by following the LTE timing rules for configuration #3, the HARQ-ACK bits for UL subframe #4 (501) in radio frame #n is transmitted on DL subframe #0 (502) in radio frame #(n+1). Simultaneously, there exists a flexible-TDD UE with configuration #0. By following the Rel. 8 LTE timing rule for configuration #0, DL subframe #0 (502) in radio frame #(n+1) is configured to transmit HARQ-ACK for two UL subframes, namely subframes #3 (503) and #4 (504) in radio frame #n for flexible-TDD UE. If factor $m_i=2$ is used for PHICH resource assignment to accommodate HARQ-ACK for the two UL subframes (subframes #3 and #4), then more REGs should be occupied by PHICH(s) and more importantly, this is unknown to the legacy UE which is configured with UL-DL configuration #3. As a result, the legacy UE will include REGs used for additional PHICH Group(s) in the PDCCH blind decoding process and will never succeed in PDCCH blind decoding intended for it.

Therefore, if the PHICH resource required for the legacy system (i.e. required by legacy UEs) is less than that for the concurrent flexible-TDD system (flexible TDD UEs), no more PHICH resource is assigned by the eNB, and the eNB should decide how the existing PHICH resource can be used by flexible-TDD UE in the manner discussed below.

Figure 6:
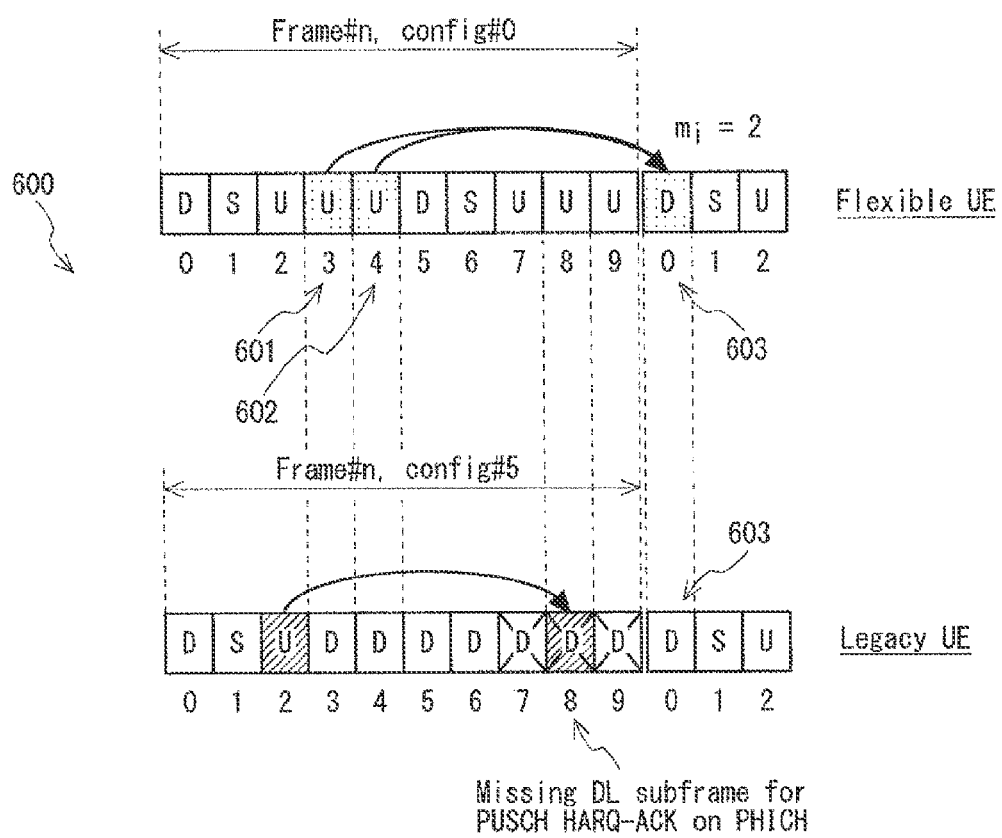
FIG. 6 contains illustrations corresponding to different example situations which are used to explain the operation of the invention (or at least embodiments of the invention) in such situations.

Referring to FIG. 6 (FIG. 6 shows resource assignment 600), the legacy UE is configured with configuration #5 and the flexible-TDD UE is configured with configuration #0. According to the Rel. 8 LTE timing rule for UL-DL configuration #5, for legacy UE, DL subframe #0 (603) is not allocated for HARQ-ACK transmission for any UL transmission using PHICH resource. For flexible-TDD UE though, if the LTE timing rule of UL-DL configuration #0 is followed, then DL subframe #0 should be configured for sending HARQ-ACK for two UL subframes, namely subframe #3 (601) and subframe #4 (602). This would cause the legacy UE to miss its intended PDCCH(s) decoding because it understands that no PHICH RE(s) are allocated on the current subframe. Therefore, in order to achieve backward compatibility, no PHICH resource is assigned on PDCCH region for the flexible-TDD UE.

Thus, there is no PHICH resource assignment even when flexible TDD UEs require it. In this case, the eNB should send ACK/NACK in the manner discussed below and the flexible TDD UE should be aware of the method to be used.

Figure 7:
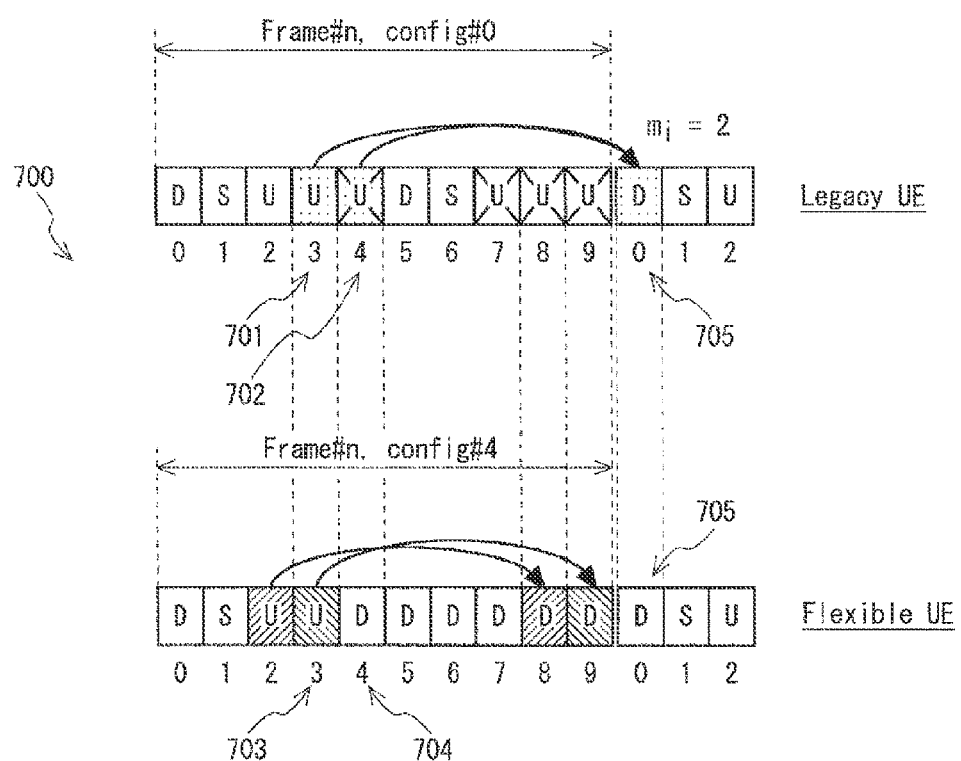
FIG. 7 contains illustrations corresponding to different example situations which are used to explain the operation of the invention (or at least embodiments of the invention) in such situations.

Referring now to FIG. 7 (FIG. 7 shows resource assignment 700), as another example, the legacy UE is configured with TDD UL-DL configuration #0 and flexible-TDD UE is configured with TDD UL-DL configuration #4. It is possible that the transmission direction of subframe #4 (702) follows the direction of the flexible-TDD system and is used as DL subframe (704), however, PHICH resource for subframe #4 (702) is still assigned in subframe #0 (705) according to timing rule of UL-DL configuration #0 to guarantee no impact on legacy UE PDCCH decoding (Subframe #3 (701) is same as subframe #3 (601).). Furthermore, since the UL HARQ-ACK for UL transmission of the flexible-TDD UE in UL subframe #3 (703) is transmitted in DL subframe #9 by following the timing rule defined for UL-DL configuration #4, PHICH resource for UL subframe #3 in DL subframe #0 (705) is over allocated in order to maintain backward compatibility i.e. allowing the legacy UE to correctly performing PDCCH(s) intended for its use. Thus, the PHICH resource is reserved for the legacy system even when there is no UL transmission on the associated subframe.

Figure 8:
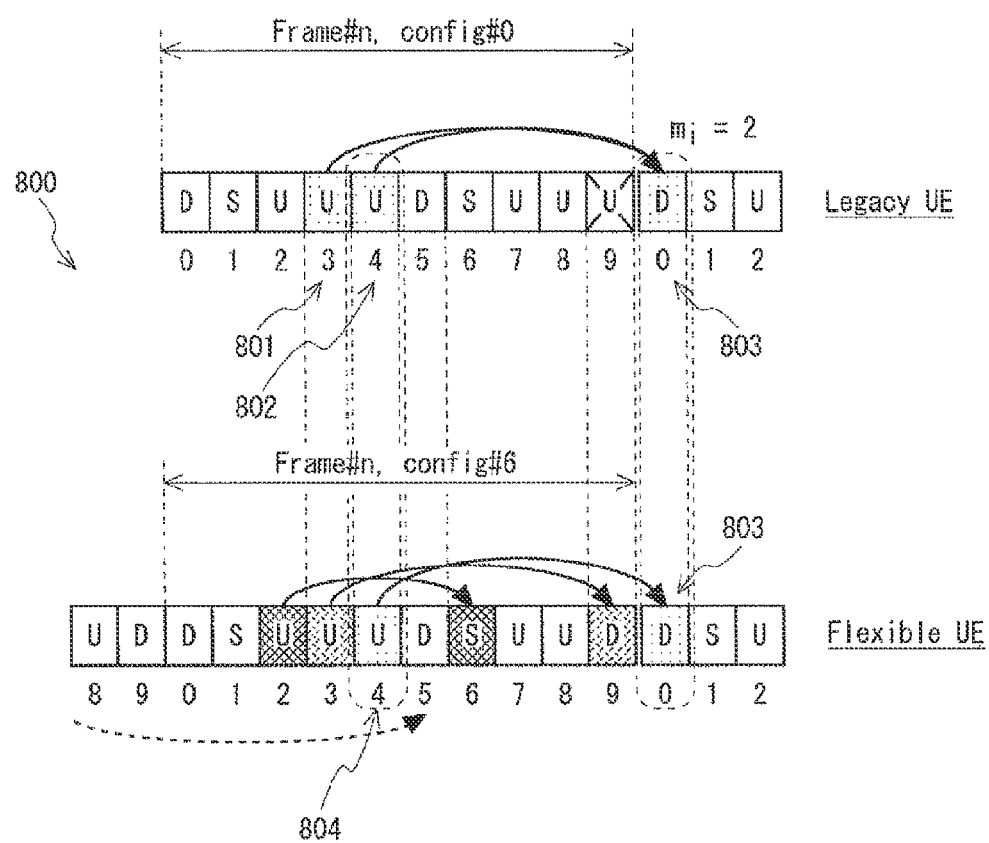
FIG. 8 contains illustrations corresponding to different example situations which are used to explain the operation of the invention (or at least embodiments of the invention) in such situations.

PHICH Resource Selection for Flexible-TDD UE with PHICH Resource Assigned According to Factor $m_i=2$ In FIG. 8 (FIG. 8 shows resource assignment 800), the legacy UE is configured with TDD UL-DL configuration #0 and the flexible-TDD UE is configured with UL-DL configuration #6. By following the LTE timing rule defined for UL-DL configuration #0, the factor $m_i=2$ is used for PHICH resource assignment and HARQ-ACK for UL subframe #3 (801) and UL subframe #4 (802) in radio frame #n are send on DL subframe #0 (803) in radio frame # (n+1). In this example, DL subframe #0 (803) in radio frame # (n+1) may also be responsible to send HARQ-ACK for one UL subframe, namely #4 (804) in radio frame #n by following timing rule defined for UL-DL configuration #6. As there are two copies of PHICH resource assigned by factor $m_i=2$, which of the copies of PHICH resource is allocated and used by flexible-TDD UEs should be decided and understood by flexible TDD UEs.

The straight forward solution in this case is to use PHICH resource related to $I_{PHICH}=0$. However, legacy UE on UL subframe #3 and flexible-TDD UE on UL subframe #4 both can have the same first PRB (Physical Resource Block) for UL transmission and the probability of PHICH collision may be increased. Instead of that, using PHICH resource related to $I_{PHICH}=1$ for flexible TDD UE may be more promising since legacy UE and flexible-TDD UE on the same UL subframe cannot use the same first PRB for UL transmission and thus PHICH collision can be more controllable.

Figure 9:
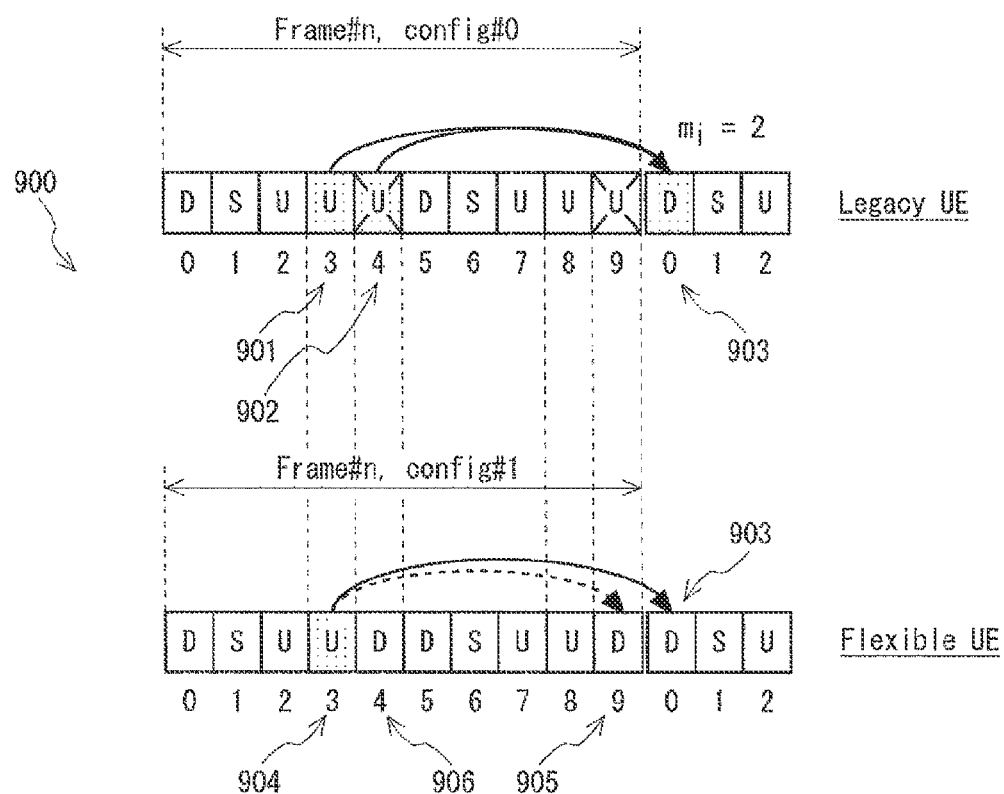
FIG. 9 contains illustrations corresponding to different example situations which are used to explain the operation of the invention (or at least embodiments of the invention) in such situations.

In reference to FIG. 9 (FIG. 9 shows resource assignment 900) as another example, the legacy UEs use the same configuration #0 and the same parameters for PHICH resource assignment as in FIG. 8. Flexible-TDD UEs are configured with TDD configuration #1 and follow a reference configuration #0 for HARQ-ACK timing. As a result, the HARQ-ACK for UL subframe #3 (904) in radio frame #n is sent on DL subframe #0 (903) in radio frame #(n+1) rather than on DL subframe #9 (905) in radio frame #n. Similar to the example depicted in FIG. 8, as there are two copies of PHICH resource assigned by factor $m_i=2$, the copy of PHICH resource allocated to and used by flexible-TDD UEs should be decided and understood by the flexible TDD UEs.

Figure 3:
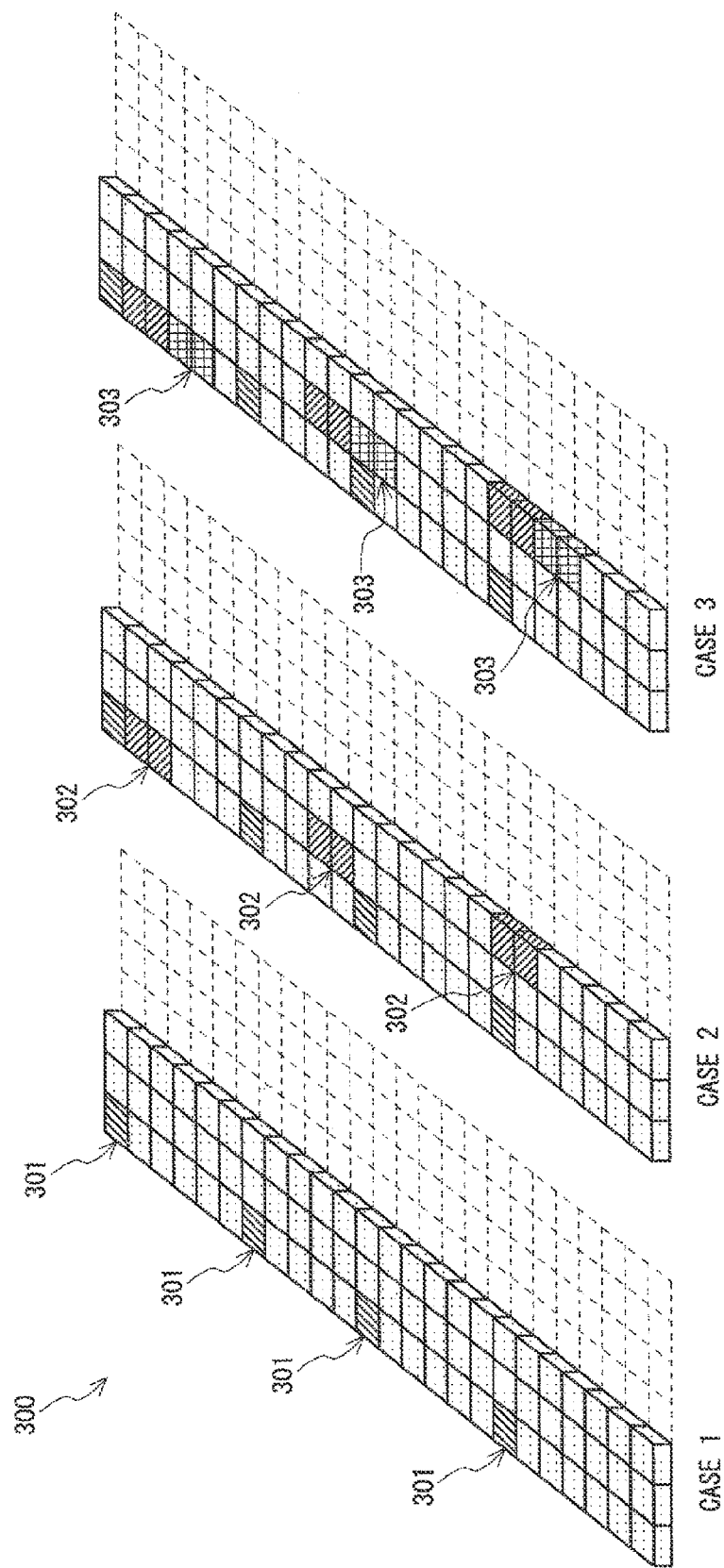
FIG. 3 contains three illustrations corresponding to the example given with reference to Case 1, Case 2 and Case 3 respectively in the Background section above.

The first option is that PHICH resource related to $I_{PHICH}=0$ should be used by flexible-TDD UEs because the same first PRB index cannot be used by two UEs on the same UL subframe. However, it is worth mentioning that, for example, subframe #4 (902) in radio frame #n has higher chance than subframe #3 (901) in radio frame #n of being configured as a DL subframe by flexible-TDD system and thus the PHICH resources assigned for $I_{PHICH}=1$ are never used by legacy UE. From the perspective of alleviating PHICH resource collision, it may therefore be beneficial to map HARQ-ACK of UL subframe #3 (904) of flexible-TDD UE to PHICH resource related to $I_{PHICH}=1$ (the second copy of PHICH resource, as illustrated in (303) of FIG. 3). FIG. 9 also shows subframe #4 (906).

Therefore, feedback HARQ-ACK on PHICH resource associated with $I_{PHICH}=1$ can be served as a unified solution for different cases. Otherwise, case specific solutions need to be applied.

Figure 10:
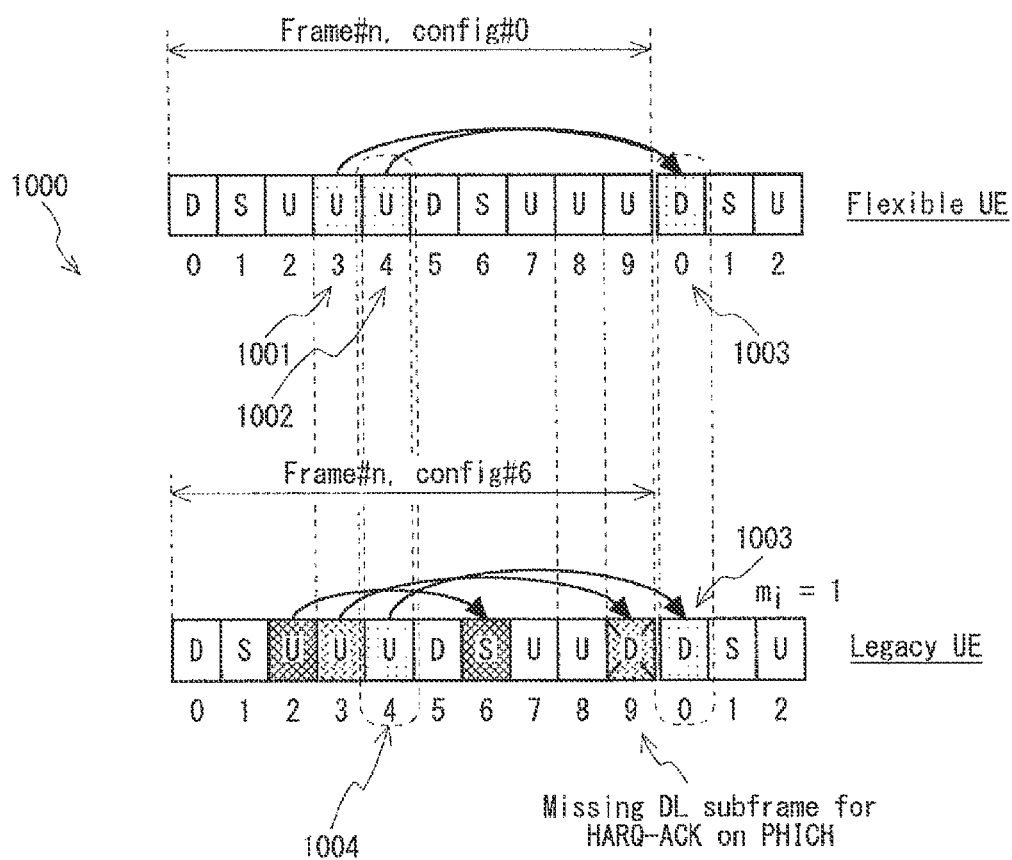
FIG. 10 contains illustrations corresponding to different example situations which are used to explain the operation of the invention (or at least embodiments of the invention) in such situations.

HARQ-ACK Transmission for UL Transmission in DL Subframe with PHICH Resource Assigned According to Factor $m_i=1$ and Flexible-TDD UE HARQ-ACK Feedback for Two UL Subframes In reference to FIG. 10 (FIG. 10 shows resource assignment 1000), Flexible-TDD UE should feedback HARQ-ACK for two UL subframes: subframe #3 (1001) and subframe #4 (1002) in radio frame #n, and PHICH resource is assigned according to factor $m_i=1$ to ensure backward compatibility. The HARQ-ACK of only one UL subframe is allowed for transmission on PHICH, but there is a need for HARQ-ACK of two UL subframes to be transmitted. It would be more promising to send HARQ-ACK for UL subframe #4 (1002) in radio frame #n rather than UL subframe #3 (1001) in radio frame #n for the sake of not increasing the probability of PHICH resource collision. The HARQ-ACK for the remaining UL subframe that cannot be transmitted using the reference configuration (e.g. subframe #3 (1001) in radio frame #n), can be transmitted via UL grant or ePHICH in the same subframe. The HARQ-ACK for UL subframe #4 (1004) in radio frame #n is sent on DL subframe #0 (1003) in radio frame #(n+1).

Figure 11:
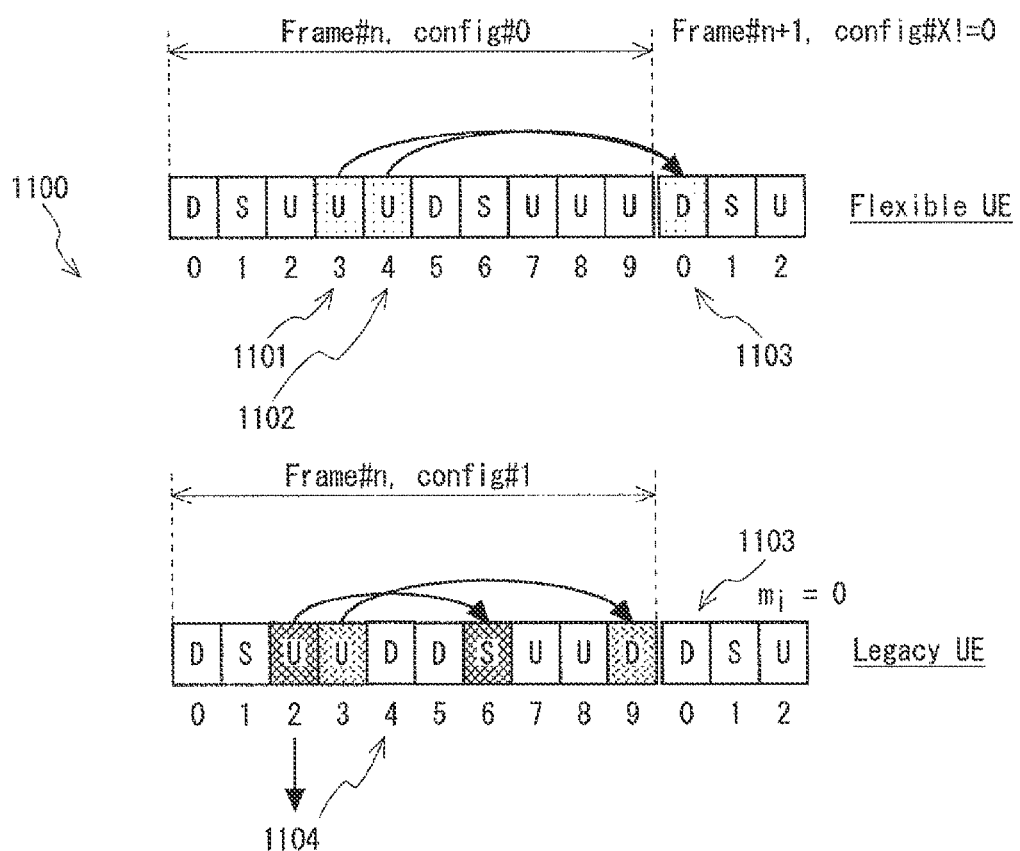
FIG. 11 contains illustrations corresponding to different example situations which are used to explain the operation of the invention (or at least embodiments of the invention) in such situations.

UL-HARQ Feedback in One DL Subframe without PHICH Resource for Flexible-TDD System In reference to FIG. 11 (FIG. 11 shows resource assignment 1100), there is no PHICH resource assignment on DL subframe #0 (1103) in radio frame #(n+1) by following the timing rule defined for UL-DL configuration #1 configured for legacy UE, but flexible-TDD system with the configured UL-DL configuration #0 needs to feedback HARQ-ACK for one/two UL subframe(s). In this case, the HARQ-ACK can be sent via UL grant implicitly, or on ePHICH explicitly. DL subframe #0 should be configured for sending HARQ-ACK for two UL subframes, namely subframe #3 (1101) and subframe #4 (1102) in FIG. 11. FIG. 11 also shows subframe #2 (1104).

Thus, an illustration of the procedure which may be implemented within a base station such as eNB (401) in FIG. 4 as "eNB's PHICH resource mapping and HARQ feedback" function (402BIS) for the correct selection of physical resources for the transmission of PUSCH HARQ-ACK ensuring no impact on legacy UE operating within eNB (401) coverage is given in the flowchart in FIG. 12A and FIG. 12B.

Similarly, a corresponding procedure which may be implemented at/in a mobile station (UE) such as Rel. 12 & beyond UE (404) in FIG. 4 as "Rel. 12 & beyond (i.e. first) UE PHICH information processing function (405BIS) for the correct reception PUSCH HARQ-ACK and processing of PHICH is given in the flowchart shown in FIG. 13A and FIG. 13B.

Following on from the embodiments of the invention discussed above, a related issue concerns the design of ePHICH resource mapping. In particular, it may be possible for ePHICH to be implemented using a backward compatible carrier where PDCCH region/PHICH is still reserved for legacy UE. In this regard, 3-bits in MIB may be used to indicate the semi-static ePHICH configuration in Rel. 11. Hence, if ePHICH and PHICH can be configured at the same time, 3-bits out of 10 spare bits in MIB can be used to indicate the ePHICH configuration. The N(group, PHICH) calculation, modulation and coding method may be reused.

The mapping of ePHICH on PRB is unknown to the legacy UE, and therefore the legacy UE should not be scheduled on PRB used for ePHICH transmission, otherwise, the performance of PDSCH will degrade. Also, for the sake of reducing the scheduling limitation of legacy UE and frequency domain ICIC, ePHICH should be assigned on a limited number of PRBs. On the other hand, ePHICH should also be distributed across DL bandwidth in order to achieve frequency diversity gain. Therefore a mapping method similar to Rel. 11 can be adopted.

Described below are about 11 steps for ePHICH resource mapping. For the purposes of explanation, let $$z^{(p)}(i) = \langle \tilde{y}^{(p)}(4i), \tilde{y}^{(p)}(4i+1), \tilde{y}^{(p)}(4i+2), \tilde{y}^{(p)}(4i+3) \rangle (i=0,1,2) \quad (1):$$

denote symbol quadruplet i for antenna port p. Mapping to resource elements may be defined in terms of symbol quadruplets according to the following steps:

1. Mapping of REG

Four consecutive REs in PRBs used for ePHICH but not used for DM-RS, CSI-RS or CRS form one REG.

In reference to FIG. 14 (FIG. 14 shows mapping 1400), CRS is configured, and accordingly there are two REGs (1401) and (1402) in OFDM symbol #4, two REGs (1403) and (1404) in OFDM symbol #7 and two REGs (1405) and (1406) in OFDM symbol #11. There are therefore a total of 6 REGs in one PRB for ePHICH (i.e. $N_{RB}^{eREG}=6$) with the presence of CRS.

In reference to FIG. 15 (FIG. 15 shows mapping 1500), CRS is not configured, and accordingly there are 3 REGs (1501), (1502) and (1503) in OFDM symbol #4, 3 REGs (1504), (1505) and (1506) in OFDM symbol #7 and 3 REGs (1507), (1508) and (1509) in OFDM symbol #11. There are therefore a total of 9 REGs in one PRB for ePHICH (i.e. $N_{RB}^{eREG}=9$) without the presence of CRS.

For special subframe, because of the limited number of DL symbols on DL subframe, ePHICH is mapped to OFDMA symbol #4, #7, #8 rather than #4, #7, #11 in normal DL subframe. The mapping pattern is similar to OFDMA #4 and #7 (with only two REGs on one OFDMA symbol of one PRB when CRS is configured), although CRS is not configured on OFDMA symbol #8.

2. Determine the PRBs used for ePHICH

Based on PHICH configuration (and additional parameter $m_i$ in TDD system) and the value of $N_{RB}^{eREG}$, the UE can determine the number of PRB used for PHICH, and the calculation of PRB number for ePHICH can be expressed as follows:

$$N_{ePHICH}^{RB} = 3\lceil N_{ePHICH}^{group}/N_{RB}^{eREG}\rceil \quad (2):$$

For example, assuming, $N_g=2$, $N_{RB}^{DL}=6$, based on $$N_{PHICH}^{group} = \begin{cases} \lceil N_g(N_{RB}^{DL}/8)\rceil \\ 2 \cdot \lceil N_g(N_{RB}^{DL}/8)\rceil \end{cases} \quad (3)$$

$$N_{ePHICH}^{group} = \lceil N_g(N_{RB}^{DL}/8)\rceil = 2 \cdot \lceil (6/8)\rceil = 2 \quad (4)$$

(In the equation (3), the upper is for normal cyclic prefix, and the lower is for extended cyclic prefix.)

One ePHICH group takes 12 RE=3 REGs.

If CRS is configured, one PRB can provide 6 eREG for ePHICH and eREG belongs to the same PRB cannot be assigned to the same ePHICH group in order to achieve diversity gain. As a result, at least 3 PRBs are needed.

3. Determine the location of PRBs for ePHICH

As mentioned above, PRBs used for ePHICH should be distributed on DL bandwidth in order to achieve frequency diversity gain. The location of PRB for ePHICH also depends on a cell-specific value $offset_{cell-x}^{PRB}$ in order to achieve frequency domain ICIC. The index of PRB used by cell-x for ePHICH can be determined by $$\left\{offset_{cell-x}^{PRB} + j, offset_{cell-x}^{PRB} + j + \frac{N_{RB}^{DL}}{3}, offset_{cell-x}^{PRB} + j + \frac{2 \cdot N_{RB}^{DL}}{3}\right\}, \quad (5)$$

$$j = 0 \ldots \frac{N_{ePHICH}^{RB}}{3}$$

In reference to FIG. 16 (FIG. 16 shows mapping 1600), assuming $N_{ePHICH}^{RB}=3$, $N_{RB}^{DL}=6$ and $offset_{cell-x}^{PRB}=0$, then the PRB indexes for these 3 PRBs are {0 (1601), 2 (1602), 4 (1603)} respectively.

4. Indexing REG for ePHICH

Let $n_{1'}$ denote the number of resource element groups for ePHICH in OFDM symbol 1'.

Number the resource-element groups not assigned to PCFICH in OFDM symbol 1' from 0 to $n_{1'}-1$, starting from the resource-element group with the lowest frequency-domain index.

5. Initialize m'=0 (PHICH mapping unit number)
6. For each value of i=0, 1, 2
7. Symbol-quadruplet $z^{(p)}(i)$ from ePHICH mapping unit m' is mapped to the resource-element group represented by $(k_i', l_i')$, where the indices $k_i'$ and $l_i'$ are given by steps 8 and 9 below:
8. The time-domain index $l_i'$ is given by $$l_i' = \begin{cases} 4(\bar{l}_i = 0) \\ 7(\bar{l}_i = 1) \\ 8 \text{ or } 11(\bar{l}_i = 2) \end{cases} \quad (6)$$

$$\bar{l}_i = \begin{cases} (\text{offset}_{cell-x}^{sym} + m')\bmod 3 \\ ((\text{offset}_{cell-x}^{sym} + m')\bmod 3 + i)\bmod 3 \end{cases} \quad (7)$$

(In the equation (6), when $l_i'$ equals 8 or 11, for special subframe $l_i'$ equals 8, and for normal subframe $l_i'$ equals 11. In the equation (7), the upper is for normal PHICH duration, all subframes, and the lower is for otherwise (Extended duration).

and $\text{offset}_{cell-x}^{sym}$ is the time domain offset of ePHICH resource for cell-x.

9. Set the frequency-domain index $k_i'$ to the resource-element group assigned the number $$\bar{n}_i \quad (8):$$

in step 4 above, where the number (8) is given by $$\bar{n}_i = \begin{cases} (\text{offset}_{cell-x}^{freq} + \lfloor m'/3 \rfloor)\bmod n_{l_i'}(i=0) \\ (\text{offset}_{cell-x}^{freq} + \lfloor m'/3 \rfloor + \lfloor n_{l_i'}/3 \rfloor)\bmod n_{l_i'}(i=1) \\ (\text{offset}_{cell-x}^{freq} + \lfloor m'/3 \rfloor + \lfloor 2n_{l_i'}/3 \rfloor)\bmod n_{l_i'}(i=2) \end{cases} \quad (9)$$

and, $\text{offset}_{cell-x}^{sym}$ is the frequency domain offset of ePHICH resource for cell-x.

In reference to FIG. 16, assuming $\text{offset}_{cell-x}^{sym}=0$ and $\text{offset}_{cell-x}^{freq}=0$ If normal duration is configured REG #0 (1604), REG #2 (1610) and REG #4 (1616) in OFDMA symbol #4 are used for ePHICH group #0.

REG #0 (1605), REG #2 (1611) and REG #4 (1617) in OFDMA symbol #7 are used for ePHICH group #1.

Cell with $$\text{offset}_{cell-y}^{sym} \neq 0 \quad (10):$$

or $$\text{offset}_{cell-y}^{freq} \neq 0 \quad (11):$$

can use other REGs, for instance.

If $\text{offset}_{cell-y}^{sym}=0$ and $\text{offset}_{cell-y}^{freq}=1$ is configured for cell-y REG #1 (1609), REG #3 (1615) and REG #5 (1621) in OFDMA symbol #4 are used for ePHICH group #0.

REG #1 (1608), REG #3 (1614) and REG #5 (1620) in OFDMA symbol #7 are used for ePHICH group #1.

If extended duration is configured

REG #0 (1604) in OFDMA symbol #4, REG #2 (1611) in OFDMA symbol #7 and REG #4 (1618) in OFDMA symbol #11 are used for ePHICH group #0.

REG #0 (1605) in OFDMA symbol #7, REG #2 (1612) in OFDMA symbol #11 and REG #4 (1616) in OFDMA symbol #4 are used for ePHICH group #0.

Similarly, for Cell with $$\text{offset}_{cell-x}^{sym} \neq 0 \quad (12):$$

or $$\text{offset}_{cell-x}^{freq} \neq 0 \quad (13):$$

can used other REGs for ePHICH.

FIG. 16 also shows REG #0 (1606), REG #1 (1607), REG #3 (1613) and REG #5 (1619).

10. Increase m' by 1.
11. Repeat from step 5 until all PHICH mapping units have been assigned.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' (or 'one aspect' or 'an aspect') means that a particular feature, function, structure, or characteristic described in connection with the embodiment (or aspect) is included in at least one embodiment (or aspects) of the present invention. Thus, for example, the appearance of the phrases 'in one embodiment' or 'in an embodiment' in various places throughout this specification are not necessarily all referring to the same embodiment. Furthermore, the particular features, functions, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The above-mentioned processing may be executed by a computer. Also, it is possible to provide a computer program which causes a programmable computer device to execute the above-mentioned processing. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R, CD-R/W, and semiconductor memories (such as mask ROM, PROM (Programmable ROM), EPROM (Erasable PROM), flash ROM, RAM (Random Access Memory), etc.). The software modules may be provided to a computer using any type of transitory computer readable media. Examples of transitory computer readable media include electric signals, optical signals, and electromagnetic waves. Transitory computer readable media can provide the software modules to a computer via a wired communication line (e.g. electric wires, and optical fibers) or a wireless communication line.

This application is based upon and claims the benefit of priority from Australian provisional patent application No. 2013900937, filed on Mar. 18, 2013, the disclosure of which is incorporated herein in its entirely by reference.

REFERENCE SIGNS LIST

100 UE ACK/NACK PROCEDURE
101 DL SUBFRAME #0
102 DL SUBFRAME #1
103 DL SUBFRAME #0
104 DL SUBFRAME #0
105 TWO UL SUBFRAMES
106 SUBFRAME #7
107 SUBFRAME #4
300 PHICH RESOURCE ASSIGNMENT
301 4 REGs
302 6 REGs
303 SECOND COPY OF PHICH RESOURCE
400 WIRELESS COMMUNICATION SYSTEM
401 eNB
402 "TDD RECONFIGURATION PROCESSING" FUNCTION
402BIS "PHICH RESOURCE MAPPING AND HARQ FEEDBACK" FUNCTION
403 LEGACY UE(S)
404 REL. 12 & BEYOND UE(S)
405 TDD RECONFIGURATION PROCESSING FUNCTION
405BIS PHICH INFORMATION PROCESSING FUNCTION
406 SIB1
407 UL-DL CONFIGURATION INFORMATION
408 PUSCH HARQ-ACK
409 HARQ-ACK FEEDBACK FOR PDSCH OR PDCCH INDICATION SPS RELEASE
500 RESOURCE ASSIGNMENT
501 UL SUBFRAME #4
502 DL SUBFRAME #0
503 SUBFRAME #3
504 SUBFRAME #4
600 RESOURCE ASSIGNMENT
601 SUBFRAME #3
602 SUBFRAME #4
603 DL SUBFRAME #0
700 RESOURCE ASSIGNMENT
701 SUBFRAME #3
702 SUBFRAME #4
703 UL SUBFRAME #3
704 DL SUBFRAME
705 SUBFRAME #0
800 RESOURCE ASSIGNMENT
801 UL SUBFRAME #3
802 UL SUBFRAME #4
803 DL SUBFRAME #0
804 UL SUBFRAME #4
900 RESOURCE ASSIGNMENT
901 SUBFRAME #3
902 SUBFRAME #4
903 DL SUBFRAME #0
904 UL SUBFRAME #3
905 DL SUBFRAME #9
906 SUBFRAME #4
1000 RESOURCE ASSIGNMENT
1001 SUBFRAME #3
1002 SUBFRAME #4
1003 DL SUBFRAME #0
1004 UL SUBFRAME #4
1100 RESOURCE ASSIGNMENT
1101 SUBFRAME #3
1102 SUBFRAME #4
1103 DL SUBFRAME #0
1104 SUBFRAME #2
1400 MAPPING
1401 to 1406 TWO REGS
1500 MAPPING
1501 to 1509 3 REGS
1600 MAPPING
1601 to 1603 PRB INDEX
1604 to 1606 REG #0
1607 to 1609 REG #1
1610 to 1612 REG #2
1613 to 1615 REG #3
1616 to 1618 REG #4
1619 to 1621 REG #5

The invention claimed is:

1. A method for PHICH (Physical H-ARQ Indicator Channel) resource allocation in a wireless communication system that supports a flexible TDD UL-DL (Time Division Duplex Uplink-Downlink) configuration and in which different TDD UL-DL configurations are available and the TDD UL-DL configuration used by first UEs (User Equipments) which operate according to the flexible TDD configuration can be different from the TDD UL-DL configuration used by second UEs which operate according to a long term TDD UL-DL configuration, the method involving, for a given subframe of a radio frame,
determining whether a first condition is fulfilled, wherein the first condition specifies that the said subframe is not a DL subframe in both the TDD UL-DL configuration in use by first UEs and in the TDD UL-DL configuration in use by second UEs,
determining whether a second condition is fulfilled, wherein the second condition specifies that the said subframe is a DL subframe in the TDD UL-DL configuration in use by first UEs and an UL subframe in the TDD UL-DL configuration in use by second UEs, and
allocating a PHICH resource based on determining that both of the first condition and the second condition are fulfilled, according to LTE timing rules applicable to the TDD UL-DL configuration in use by first UEs.

2. The method for PHICH resource allocation as claimed in claim 1 further including,
determining whether a third condition is fulfilled, wherein the third condition specifies that said given subframe is a DL subframe in the TDD UL-DL configuration in use by first UEs and also in the TDD UL-DL configuration in use by second UEs,
determining whether a fourth condition is fulfilled, wherein the fourth condition specifies that a PHICH resource is not required by second UEs for said given subframe, and
allocating no PHICH resource to the subframe when both of the third condition and the fourth condition are fulfilled.

3. The method for PHICH resource allocation as claimed in claim 2 further including, for said given subframe,
determining whether a fifth condition is fulfilled, wherein the fifth condition specifies that a PHICH resource is required by first UEs,
calculating the PHICH resource, when all of the third condition, the fourth condition and the fifth condition are fulfilled, required for sending PUSCH HARQ-ACK or remaining PUSCH HARQ-ACK, and allocating the PHICH resource for transmission thereof via ePHICH IE if available and enabled or via UL grant if ePHICH IE is not available or not enabled.

4. The method for PHICH resource allocation as claimed in claim 2 further including,
   determining whether a sixth condition is fulfilled, wherein the sixth condition specifies that a PHICH resource is required by second UEs for said given subframe,
   determining whether a seventh condition is fulfilled, wherein the seventh condition specifies that the PHICH resource is not required by first UEs, and
   allocating the PHICH resource, when all of the third condition, the sixth condition and the seventh condition are fulfilled, according to the LTE timing rules applicable to the TDD UL-DL configuration in use by second UEs.

5. The method for PHICH resource allocation as claimed in claim 4 further including,
   determining whether an eighth condition is fulfilled, wherein the eighth condition specifies that a PHICH resource is required by first UEs for said given subframe,
   determining whether a ninth condition is fulfilled, wherein the ninth condition specifies that the PHICH resource required by second UEs is not less than that required by first UEs,
   determining whether a tenth condition is fulfilled, wherein the tenth condition specifies that the PHICH resource required by second UEs is not more than that required by first UEs, and
   allocating the PHICH resource, when all of the third condition, the sixth condition, the eighth condition, the ninth condition and the tenth condition are fulfilled, according to the LTE timing rules applicable to the TDD UL-DL configuration in use by second UEs.

6. The method for PHICH resource allocation as claimed in claim 5 further including,
   determining whether an eleventh condition is fulfilled, wherein the eleventh condition specifies that the PHICH resource required by second UEs is more than that required by first UEs for said given subframe,
   allocating the PHICH resource, when all of the third condition, the sixth condition, the eighth condition, the ninth condition and the eleventh condition are fulfilled, according to the LTE timing rules applicable to the TDD UL-DL configuration in use by second UEs, and
   allocating the PHICH resource with a PHICH group number ($I_{PHICH}$) equal to one for first UEs.

7. The method for PHICH resource allocation as claimed in claim 5 further including,
   determining whether a twelfth condition is fulfilled, wherein the twelfth condition specifies that the PHICH resource required by second UEs is less than that required by first UEs for said given subframe,
   allocating the PHICH resource, when all of the third condition, the sixth condition, the eighth condition, and the twelfth condition are fulfilled, according to the LTE timing rules applicable to the TDD UL-DL configuration in use by second UEs, and
   allocating the PHICH resource for first UEs to accommodate HARQ-ACK for (an) associated UL subframe(s) that have PUSCH HARQ-ACK timing aligned with that of second UEs.

8. The method for PHICH resource allocation as claimed in claim 7 further including, for said given subframe
   calculating the PHICH resource, when all of the third condition, the sixth condition, the eighth condition, and the twelfth condition are fulfilled, required for sending PUSCH HARQ-ACK or remaining PUSCH HARQ-ACK of first UEs, and
   allocating the PHICH resource for transmission thereof via ePHICH IE if this is available and enabled or via UL grant if ePHICH IE is not available or not enabled.

9. A base station configured for use in a wireless communication system that supports a flexible TDD UL-DL configuration and in which different TDD UL-DL configurations are available and the TDD UL-DL configuration used by first UEs which are configured to operate according to the flexible TDD configuration can be different from the TDD UL-DL configuration used by second UEs which are configured to operate according to a long term TDD UL-DL configuration, wherein the base station comprises a processor and a memory storing instructions that, when executed by the processor, causes the processor to, for a given subframe of a radio frame,
   determine whether a first condition is fulfilled, wherein the first condition specifies that the said subframe is not a DL subframe in both the TDD UL-DL configuration in use by first UEs and the TDD UL-DL configuration in use by second UEs;
   determine whether a second condition is fulfilled, wherein the second condition specifies that the said subframe is a DL subframe in the TDD UL-DL configuration in use by first UEs and an UL subframe in the TDD UL-DL configuration in use by second UEs, and
   allocate a PHICH resource based on determining that both of the first condition and the second condition are fulfilled, according to LTE timing rules applicable to the TDD UL-DL configuration in use by first UEs.

10. A mobile station configured for use by first UEs for PUSCH HARQ-ACK and PHICH signalling in a wireless communication system that supports a flexible TDD UL-DL configuration and in which different TDD UL-DL configurations are available and the TDD UL-DL configuration used by the first UEs which operate according to the flexible TDD configuration can be different from the TDD UL-DL configuration used by second UEs which operate according to a long term TDD UL-DL configuration, wherein the mobile station comprises a processor and a memory storing instructions that, when executed by the processor, causes the processor to, for a given flexible DL subframe of a radio frame in the TDD UL-DL configuration in use by the first UEs:
   determine whether a first condition is fulfilled, wherein the first condition specifies that a corresponding subframe in the TDD UL-DL configuration in use by the second UEs is not a DL subframe,
   determine whether a second condition is fulfilled, wherein the second condition specifies that the given DL subframe in the TDD UL-DL configuration in use by the first UEs is to carry PUSCH HARQ-ACK for first UEs, and
   monitor for PHICH allocation based on determining that both of the first condition and the second condition are fulfilled, according to LTE timing rules applicable to the TDD UL-DL configuration in use by first UEs.

* * * * *